US012754670B1

(12) United States Patent
Olsson et al.

(10) Patent No.: US 12,754,670 B1
(45) Date of Patent: Oct. 6, 2026

(54) EVENT DATA RECORDING BUFFERING

(71) Applicant: QUALCOMM Incorporated, San Diego, CA (US)

(72) Inventors: Martin Olsson, Linköping (SE); Henrik Stenqvist, Ljungsbro (SE); Thommy Jakobsson, Mjölby (SE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/098,868

(22) Filed: Apr. 2, 2025

(51) Int. Cl.
*G06F 12/00* (2006.01)
*G06F 3/06* (2006.01)

(52) U.S. Cl.
CPC ............ *G06F 3/061* (2013.01); *G06F 3/0656* (2013.01); *G06F 3/0673* (2013.01)

(58) Field of Classification Search
CPC ....... G06F 3/061; G06F 3/0656; G06F 3/0673
USPC .......................................................... 711/105
See application file for complete search history.

(56) References Cited

U.S. PATENT DOCUMENTS

2015/0134709 A1* 5/2015 Lee ..................... G06F 16/2237 707/812
2023/0282044 A1* 9/2023 Brodt ..................... G07C 5/085 701/29.1

FOREIGN PATENT DOCUMENTS

WO WO-0163561 A1 * 8/2001 ............ G06T 15/40

* cited by examiner

*Primary Examiner* — Mardochee Chery
(74) *Attorney, Agent, or Firm* — Procopio, Cory, Hargreaves & Savitch LLP

(57) ABSTRACT

Aspects presented herein may enable a device to write received data just once when the received data is consumed both by a regular real-time pipe-line and by an event data recording round-robin buffering, thereby reducing additional dynamic random-access memory (DRAM) write bandwidth consumed during nominal operation(s). In one aspect, a device allocates a first set of buffers in a plurality of buffers for a set of pre-processed frames, where the first set of buffers is associated with a first round-robin cycle with a first time-span. The device allocates a second set of buffers in the plurality of buffers for preserving a set of previously processed frames, where the second set of buffers is associated with a second round-robin cycle with a second time-span. The device enables the second set of buffers to be accessed when a triggering condition occurs.

20 Claims, 14 Drawing Sheets

EVENT DATA RECORDING BUFFERING

TECHNICAL FIELD

The present disclosure relates generally to system buffering, and more particularly, to event data recording (EDR) buffering for vehicles.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus allocates a first set of buffers in a plurality of buffers for a set of pre-processed frames, where the first set of buffers is associated with a first round-robin cycle with a first time-span. The apparatus allocates a second set of buffers in the plurality of buffers for preserving a set of previously processed frames, where the second set of buffers is associated with a second round-robin cycle with a second time-span. The apparatus enables the second set of buffers to be accessed when a triggering condition occurs.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
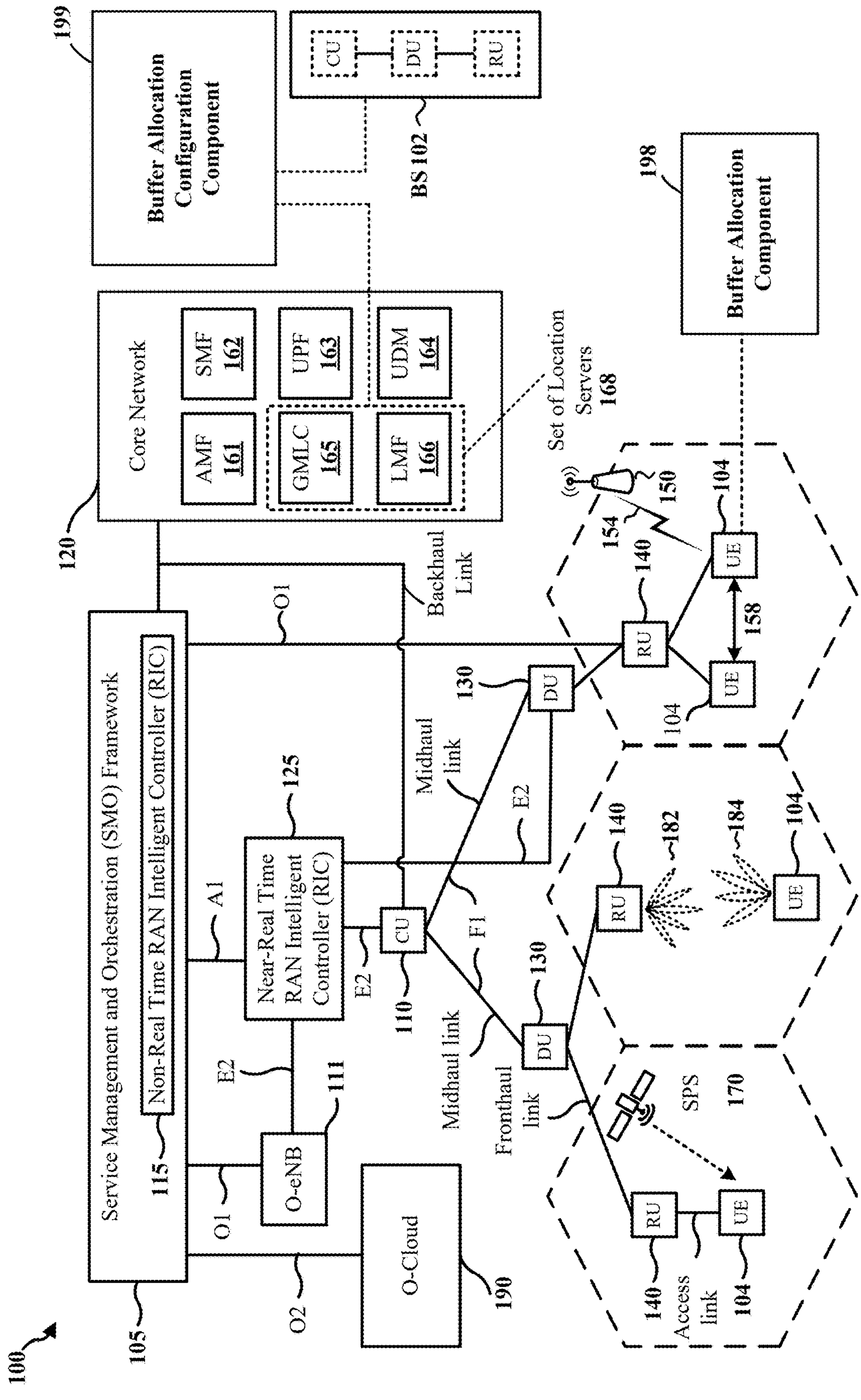
FIG. 1 is a diagram illustrating an example of a wireless communications system and an access network.

Aspects presented herein may improve the overall performance and efficiency of buffering, such as round-robin buffering for event data recording (EDR). For example, in one aspect of the present disclosure, a scheme is provided that is capable of ensuring data received in a pipeline is written once, also in the cases where data is consumed both by a "regular real-time pipe-line" and by "event data round-robin buffering." The advantage with this scheme is that no additional dynamic random-access memory (DRAM) write bandwidth is consumed during nominal operation. The scheme also conserves the numbers of total buffers used, which may minimize the specified DRAM space allocated for the two purposes. In another aspect of the present disclosure, a scheme is provided that is capable of retaining a time-wise sparse set of buffer contents representing an extended time interval. This may be particularly meaningful/useful when, in the context of advanced driver assistance systems (ADAS), identifying scenarios leading up to an incident or anomaly that does not specify dense time-sampling to facilitate annotation and re-construction of the event (e.g., the reconstruction may associate objects from also sparsely selected time-samples). In another aspect of the present disclosure, a scheme is provided that is capable of retaining a set of buffer contents with spatially down-sampled content. Spatial down-sampling (or pyramid level generation) may often be an inherent part of convolutional neural network (CNN) processing, digital signal processing (DSP) processing, and/or computer vision (CV)-processing schemes. This means that no additional DRAM write-cycles (beyond what is used for the regular pipe-line) is used when extending the scheme to an EDR. In another aspect of the present disclosure, a scheme is provided where multiple pipelines subscribe to a stream of frames are using the stream of frames with a combination of design patterns, such as event buffering, pipelined perception, low level fusion systems, and/or reality augmentation, etc. Each pipeline subscriber may assign ownership to a buffer content by other associating a token or increasing a count (subscribing to buffer). A pool of buffers may then administrate the remaining subscription and return the buffers to the pool once there is no active subscriber left.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a buffer allocation component 198 that may be configured to allocate a first set of buffers in a plurality of buffers for a set of pre-processed frames, where the first set of buffers is associated with a first round-robin cycle with a first time-span; allocate a second set of buffers in the plurality of buffers for preserving a set of previously processed frames, where the second set of buffers is associated with a second round-robin cycle with a second time-span; and enable the second set of buffers to be accessed when a triggering condition occurs. In certain aspects, the base station 102 or the one or more location servers 168 may have a buffer allocation configuration component 199 that may be configured to provide buffer related configuration(s) to the UE 104.

Figures 2A, 2B, 2C, 2D:
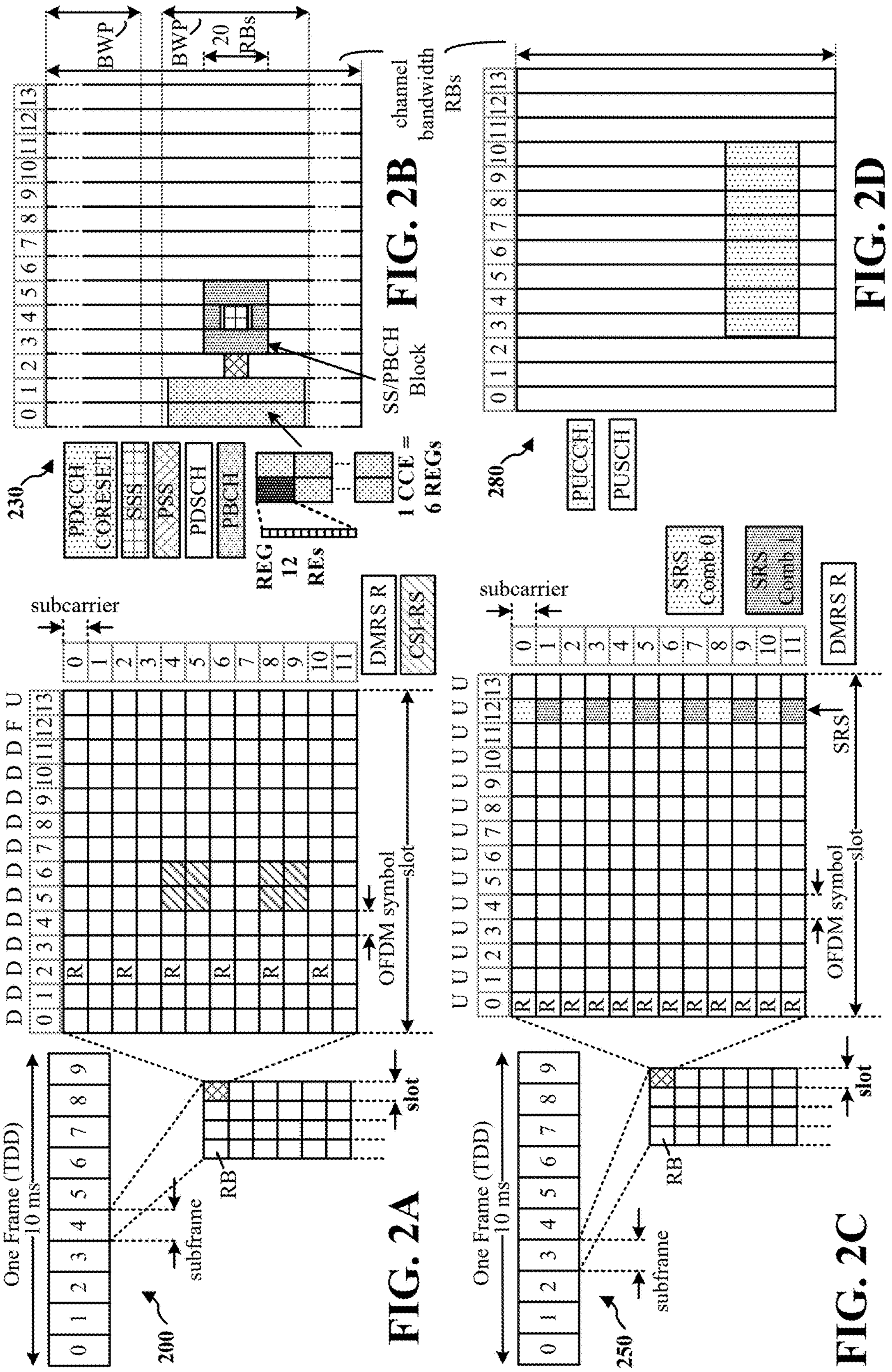
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies u 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and 24 slots/subframe. The subcarrier spacing may be equal to $2_{\mu}$*15 kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
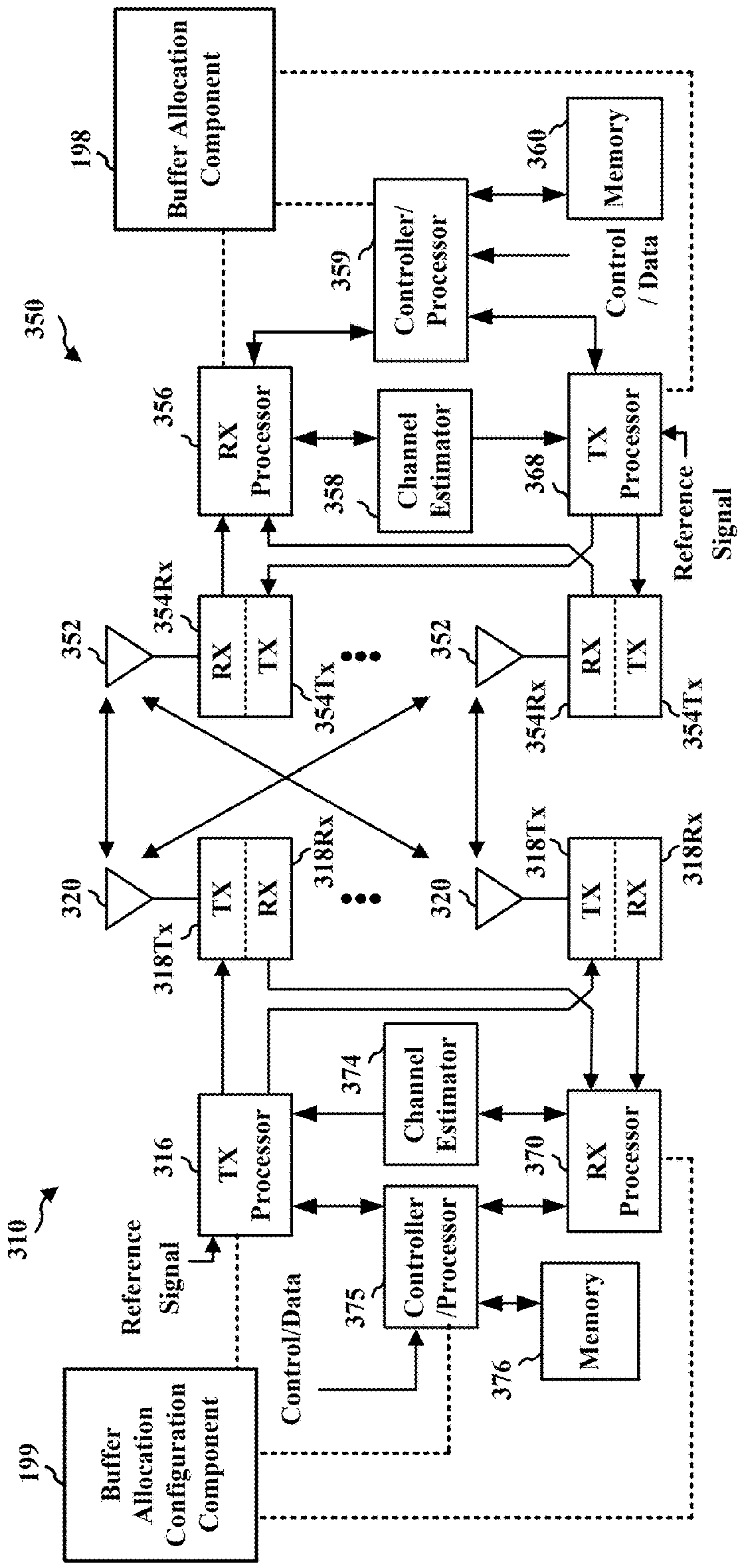
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the buffer allocation component 198 of FIG. 1.

At least one of the TX processor 316, the RX processor 370, and the controller/processor 375 may be configured to perform aspects in connection with the buffer allocation configuration component 199 of FIG. 1.

In recent years, vehicle manufacturers have been developing vehicles with assisted driving and/or autonomous driving capabilities. Assisted driving, which may also be called advanced driver assistance systems (ADAS), may refer to a set of technologies designed to enhance vehicle safety and improve the driving experience by providing assistance and automation to the driver. These technologies may use various sensor(s), such as camera(s), radar(s), light detection and ranging (lidar(s) or lidar sensor(s)), etc., and other components to monitor a vehicle's surroundings and assist the driver of the vehicle with certain driving tasks. For example, some features of assisted driving systems may include: (1) adaptive cruise control (ACC) (e.g., a system that automatically adjusts a vehicle's speed to maintain a safe following distance from the vehicle ahead), (2) lane-keeping assist (LKA) (e.g., a system that uses cameras to detect lane markings and helps keep the vehicle centered within the lane, and provides steering inputs to prevent unintentional lane departure), (3), autonomous emergency braking (AEB) (e.g., a system that detects potential collisions with obstacles or pedestrians and automatically apply the brakes to avoid or mitigate the impact), (4) blind spot monitoring (BSM) (e.g., a system that uses sensors to detect vehicles in a driver's blind spots and provides visual or audible alerts to avoid potential collisions during lane changes), (5) parking assistance (e.g., a system that assists drivers in parking their vehicles by using camera(s) and sensor(s) to help with parallel parking or maneuvering into tight spaces), and/or traffic sign recognition (e.g., camera(s) and image processing are used to recognize and display traffic signs such as speed limits, stop signs, and other road regulations on the vehicle's dashboard).

Autonomous driving (AD), which may also be referred to as the autonomous driving system (ADS), self-driving, and/or driverless technology, may refer to the ability of a vehicle to navigate and operate itself without specifying human intervention (e.g., travelling from one place to another place without a human controlling the vehicle). The goal of the autonomous driving is to create vehicles that are capable of perceiving their surroundings, making decisions, and controlling their movements, all without the direct involvement of a human driver. To achieve or improve the autonomous driving, a vehicle may be specified to use a map (or map data) with detailed information, such as a high-definition (HD) map. An HD map may refer to a highly detailed and accurate digital map designed for use in autonomous driving and ADAS. In one example, HD maps may typically include one or more of: (1) geometric information (e.g., precise road geometry, including lane boundaries, curvature, slopes, and detailed 3D models of the surrounding environment), (2) lane-level information (e.g., information about individual lanes on the road, such as lane width, lane type (e.g., driving, turning, or parking lanes), and lane connectivity), (3) road attributes (e.g., data on road features like traffic signs, signals, traffic lights, speed limits, and road markings), (4) topology (e.g., information about the relationships between different roads, intersections, and connectivity patterns), (5) static objects (e.g., locations and details of fixed objects along the road, such as buildings, traffic barriers, and poles), (6) dynamic objects (e.g., real-time or frequently updated data about moving objects, like other vehicles, pedestrians, and cyclists), and/or (7) localization and positioning: precise reference points and landmarks that help in accurate vehicle localization on the map, etc.

Note while some assisted/autonomous driving systems may demand the use of HD map data, there are also assisted/autonomous driving systems and information systems that may be configured not to use HD map data (e.g., due to costs). For example, the Society of Automotive Engineers (SAE) has defined six levels of driving automation, from Level 0 (no automation) to Level 5 (full automation). For Level 0 (no automation), the human driver may be responsible for all aspects of driving, and the system may provide warnings or momentary assistance but does not take control of the vehicle. Example features for SAE Level 0 may include automatic emergency braking, blind spot warnings, and lane departure warnings, etc. As such, SAE Level 0 may not specify using HD map data. For Level 1 (driver assistance), the vehicle may assist with either steering or acceleration/deceleration (but may not perform both simultaneously). The human driver is still responsible for most driving tasks and may need to be ready to take over at any time. Example features for SAE Level 1 may include adaptive cruise control or lane-keeping assistance (e.g., lane centering), etc. For Level 2 (partial automation), the vehicle may control both steering and acceleration/deceleration under certain conditions, but the human driver is requested to remain engaged and monitor the driving environment at all times. Example features for SAE Level 2 may include ADAS, adaptive cruise control and lane-keeping assistance at the same time, etc. For Level 3 (conditional automation), the vehicle may perform all driving tasks under specific conditions, and the human driver may not be specified to monitor the environment but may need to be ready to take over when requested by the system. Example features for SAE Level 3 may include traffic jam chauffeur, where the vehicle is capable of handling driving in traffic jams without driver intervention. For Level 4 (high automation), the vehicle is capable of handling all driving tasks within certain conditions or environments (geofenced areas). The system may operate without human intervention but may specify a human driver outside its operational domain. Example features for SAE Level 4 may include local driverless taxi and pedals/steering, etc. For Level 5 (full automation), the vehicle is capable of performing all driving tasks under all conditions, and does not specify the human driver at any time. Example features for SAE Level 5 may include fully autonomous vehicles with no steering wheel or pedals. In summary, SAE Level 0 may be defined as features to provide warnings and assistance. ADAS is usually SAE Level 1 and 2, while AD is considered SAE level 3 to 5.

To enable a vehicle to be capable of providing assisted driving and/or autonomous driving, the vehicle may be configured to use various machine learning (ML) and/or neural network (NN) frameworks. An ML/NN framework may refer to a set of tools, libraries, and/or software components that are configured to provide a structured way to design, build, and deploy ML/NN models and applications. These frameworks may be able to simplify the process of developing ML/NN algorithms and applications by providing a foundation of pre-built functions, algorithms, and utilities. They may typically include features for data preprocessing, model training, evaluation, and/or deployment, etc. ML/NN frameworks may come in various programming languages, and they may be configured to cater to different types of machine learning tasks, including supervised learning, unsupervised learning, and/or reinforcement learning, etc. An ML/NN model may refer to a mathematical representation of a real-world process or problem, created using ML/NN algorithms and techniques. These ML/NN models may be configured to make predictions, classify data, and/or solve specific tasks based on patterns and relationships learned from input data. A deep learning framework may refer to a specialized software library or toolset that provides specified components and abstractions for building, training, and deploying deep neural networks. Deep learning frameworks may be designed to facilitate the development of complex neural network models, especially deep neural networks with multiple layers. These frameworks may offer a wide range of pre-implemented layers, optimizers, loss functions, and other components, making it easier for researchers and developers to work with deep learning models.

Figure 4:
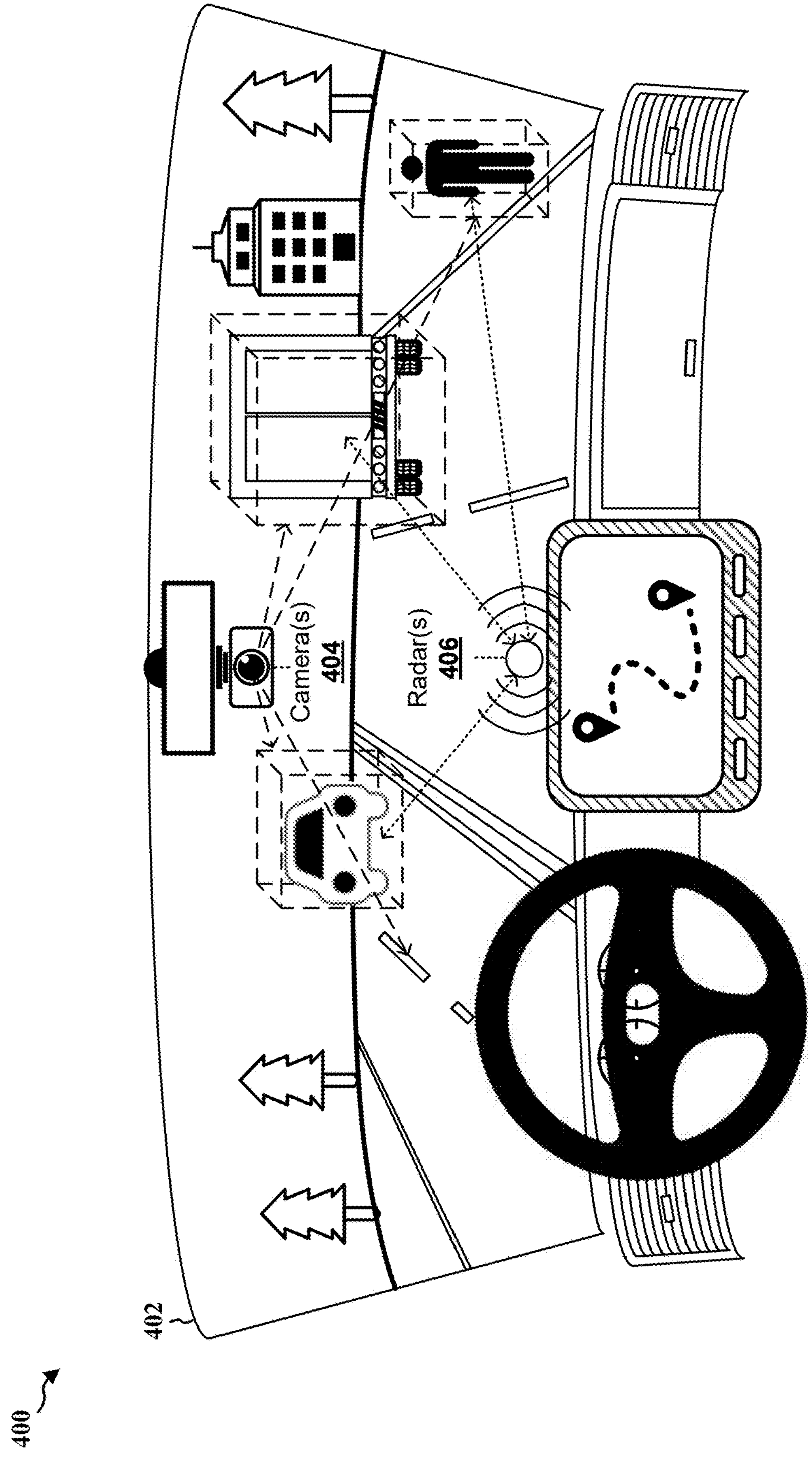
FIG. 4 is a diagram illustrating an example of a vehicle performing road object detection using different types of sensors in accordance with various aspects of the present disclosure.

FIG. 4 is a diagram 400 illustrating an example of a vehicle performing road object detection using different types of sensors in accordance with various aspects of the present disclosure. In some implementations, a vehicle system may be configured to perform road object detections using multiple types of sensors (and also one or more ML/NN models). For purposes of the present disclosure, a road object or a traffic participant may refer to an object that is related to roads and driving, and is typically/commonly used/considered by the vehicle system in providing assisted driving or performing autonomous driving. In some examples, the road object/traffic participant may also be referred to as a "traffic object" or a "traffic-related object." For example, a road object/traffic participant may be another vehicle, a pedestrian, a cyclist/bicycle, an animal, a traffic cone, a traffic sign, a traffic light, traffic, a traffic lane, a traffic line, a vulnerable road user (VRU), an object that is within a threshold distance of the vehicle, and/or any objects that may typically present on the roads (e.g., on the driving paths of vehicles), etc. On the other hand, a non-road object or a non-traffic participant (which may also be referred to as a non-traffic related object) may refer to an object that is not related to roads and driving, and is typically/commonly not used/considered by the vehicle system in providing assisted driving or performing autonomous driving. For example, a non-road object/non-traffic participant may be an object that is not within a threshold distance of the vehicle (e.g., a house on the side of the road, a mountain that is far away), an object that is not typically presented on a driving path/road (an airplane, a fire hydrant, a tree, etc.), a structure that is typically not traversed by vehicles (e.g., a pedestrian bridge), etc. An ML/NN model may be trained to identify whether an object is a road object or a non-road object.

For example, as shown by the diagram 400, a vehicle or a vehicle system (collectively as a "UE 402") may be configured to use different types of sensors, such as a set of cameras 404 and/or a set of radars 406 for detecting road objects. For purposes of the present disclosure, the term "radar" may broadly refer to a device/component that is capable of detecting at least the presence and/or the distance of a physical object. Examples of radar may include an RF radar, a sonar, an ultrasonic sensor, a light detection and ranging (lidar), etc. In some implementations, the UE 402 may also use different MN/NN models for identifying different types of road objects. For example, a first ML/NN model may be trained/used to detect and track polylines from sensor output(s) (e.g., images captured by the camera(s) of the vehicle, point clouds generated from radar(s)/lidar(s), etc.), while a second ML/NN model may be trained/used to detect and track objects in a three-dimensional (3D) space (e.g., to perform 3D object detection (3DOD) tasks). Then, the outputs of different types of sensors (e.g., from the set of cameras 404 and the set of radars 406) may be processed and used by the ADAS or the autonomous driving system (e.g., for assisted/autonomous driving). A point cloud may refer to a discrete set of data points in space, where these points may represent a 3D shape or object. In some implementations, each point position may be associated with a set of Cartesian coordinates (X, Y, Z). Point clouds may be produced by radar(s)/lidar(s) by detecting multiple points on the external surfaces of objects.

For purposes of the present disclosure and in the context of assisted/autonomous driving, a vehicle that is capable of performing autonomous driving and/or certain amount of assisted driving may be referred to as an "ego vehicle" or simply "ego." For example, an "ego lane" may refer to a lane in which an ego vehicle itself is currently driving. As such, the term "ego" in such context may refer to the vehicle itself, and the term "ego lane" may imply that it is the lane where the (ego) vehicle is actively maneuvering and making decisions. Depending on the context, the term "ego lane" may be used for differentiating the lane occupied by the ego/autonomous vehicle from other lanes on the road.

Memory (or system memory) may be a fundamental component for most electronic devices (e.g., a UE, a mobile device, an ECU, etc.) responsible for (temporarily) storing and managing data that one or more processors specify to execute instructions efficiently. The memory hierarchy may be designed to balance speed, capacity, and cost, ensuring optimal performance in processing tasks. At its core, memory may be organized into different levels, each level configured to serve a specific role in data storage and retrieval. These levels may include registers, cache memory, main memory (RAM), and secondary storage, etc. with each layer varying in speed and accessibility.

In the context of memory, registers may refer to the smallest and fastest type of memory, typically located directly inside a central processing unit (CPU). Registers may store data and instructions that are immediately specified for execution. Cache memory, which is slightly larger but still limited in capacity, may serve as an intermediary between the CPU and the main memory, reducing access time by keeping frequently used data close to the processor. The main memory, or random access memory (RAM), may be configured to hold active programs and data, allowing for fast read and write operations. Unlike storage devices such as hard drives and solid state drives (SSDs), RAM is volatile, meaning its contents are lost when the system powers down.

Beyond the main memory, secondary storage may provide long-term data retention, ensuring that programs, files, and the operating system persist even when the computer is turned off. Modern systems may also incorporate virtual memory, which extends RAM capacity by using portions of the storage drive to simulate additional memory when physical RAM is insufficient. The efficiency of system memory structure may directly impact the performance of a device, as faster memory access is likely to result in smoother operation, reduced latency, and improved multi-tasking capabilities. For example, memory used in automotive systems/sub-systems usually specifies high efficiency and/or performance as the memory may be specified to process time-critical tasks (e.g., autonomous/assisted driving related tasks).

Sensor systems based on image frame capture (e.g., the set of cameras 404 as described in connection with FIG. 4) may typically employ a pipe-line scheme with buffers used in a round-robin scheme for purpose of supporting implementation of a multi-stage approach, where input frames are stored in buffers for use by different pipeline steps. Also, buffers may be configured to be used and released in a cyclic pattern. For purposes of the present disclosure, a buffer may refer to a temporary storage area in memory used to hold data being transferred between devices, processes, or components that operate at different speeds or with different capabilities. Buffers may typically be used for smoothing out the flow of data and preventing interruptions by temporarily storing data until it is able to be processed or transferred further. Buffers may be implemented to optimize the performance and to ensure the efficient communication within systems. Note the image frame (or just "frame") described herein is to be distinguished and different from the frame related to radio link discussed in connection with FIGS. 2A to 2D.

In some scenarios, sensory systems related to ADAS/AD system (e.g., camera(s)) may be subjected to anomaly analysis that may depend on having buffered, captured, stored, and/or uploaded sequences of frames (e.g. may refer to image frames captured by a camera) that may lead an anomaly investigation to a conclusion related to insufficiency, malfunction, or lead the development of nominal function to a better performance, or ability to cope with scene content that was previously not reflected in validation databases.

When buffering is used by an event data recorder (EDR), the taxation on dynamic random-access memory (DRAM) bus from writing the buffers to be kept may easily grow to compete with more valuable functions or improvements on detection performance. An event data recorder/EDR may refer to a device installed in a vehicle that is configured to capture and store data related to the performance of the vehicle and the actions of the driver before, during, and/or after a crash or other significant event (e.g., it may be similar to a "black box" of airplanes). In general, there may be an underlying assumption that DRAM bandwidth may be the bottleneck of integrated solutions, and thus DRAM bandwidth limitations may also limit the utilization of compute resources.

Captured frames for anomaly analysis may undergo different analytics processes with different specifications, such as: (1) detailed analysis of convolutional neural network (CNN) and computer vision (CV) processing results of individual frames and frame-to-frame variations at pixel level, and/or (2) approximate analysis of scene composition and temporal progression of geometry, positions, and motion vectors, etc. While the used and allocated buffers may have an inherent order and appears as a "round-robin," the pool of momentarily unused buffers may not demand to have an order and may be invoked or allocated without consideration of the order-or-release.

Figure 5:
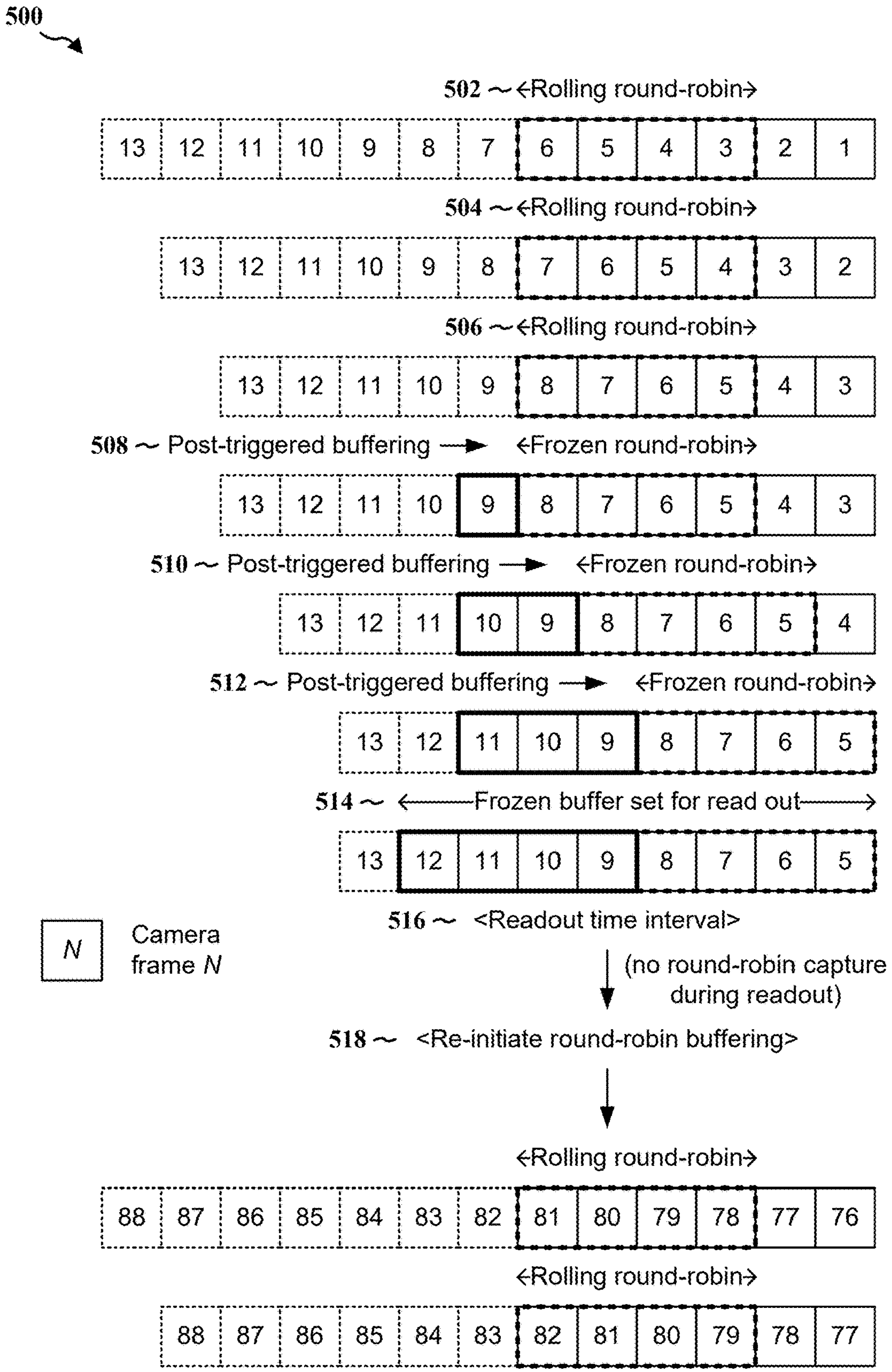
FIG. 5 is a diagram is a diagram illustrating an example period of round-robin buffering with post-triggered buffering in accordance with various aspects of the present disclosure.

FIG. 5 is a diagram 500 is a diagram illustrating an example period of round-robin buffering with post-triggered buffering in accordance with various aspects of the present disclosure. In the context of EDR, round-robin buffering may refer to a data storage technique that is configured to manage continuous data recording efficiently by working like a circular buffer, where incoming data is configured to continuously overwrite the oldest data once the buffer reaches its assigned capacity or time. For example, data may be written sequentially into a fixed-size buffer. When the buffer is full, new data overwrites the oldest data, looping back to the beginning of the buffer. If an event of interest occurs, the buffer may preserve data from before and after the trigger. In addition, in the context of EDR, a trigger, a triggering event, and/or a post-triggering buffering may refer to a technique used to capture data that occurs after a specific triggering event or condition. For example, when an event of interest occurs (the trigger, such as a collision is detected), the sensor system (or the ECU of the vehicle) may begin recording data not just from the moment of the trigger but also capture a certain amount of data that occurred immediately before the trigger. This may be important for understanding the sequence of events leading up to and following the trigger point, providing a more comprehensive picture of what transpired.

A round-robin buffer may be configured to keep a time-interval or a number of frames continuously buffered. For purposes of illustration, assuming the round-robin buffer in an EDR of a vehicle is configured to buffer (a maximum of) four frames (e.g., four image frames from a camera). After the EDR receives a sequence of frames (e.g., frames #1 to #N) from at least one camera, the EDR may continuously store the sequence of frames in the round-robin buffer. For example, as shown at 502, at one point in time, the EDR may store frames #3 to #6. Then, as shown at 504, at a next point in time (or after the EDR receives a next frame #7), the EDR may store frames #4 to #7, where frame #3 may be overwritten by the frame #7. Similarly, as shown at 506, at a next point in time (or after the EDR receives a next frame #8), the EDR may store frames #5 to #8, where frame #4 may be overwritten by the frame #8. Based on this configuration, the EDR may continue to store at most four frames in the round-robin buffer, where one frame may be overwritten in the buffer when a new frame comes.

When a trigger event occurs (e.g., when the vehicle is detected to be in an accident), the EDR may be configured to stop the overwriting of the round-robin buffer, and the buffer content may be retained temporarily frozen. For example, as shown at 508, after the trigger event occurs and the EDR receives a subsequent frame #9, instead of overwriting frame #5 with frame #9, frames #5 to #8 are "frozen" by the EDR, and frame #9 is stored at a new buffer. For purposes of the present disclosure, this new buffer or the buffering after the trigger event may be referred to as the "post-triggered buffering," and the round-robin buffer that is being frozen may be referred to as the "frozen round-robin buffer." As shown at 510 and 512, the EDR may continue to store subsequent frames (e.g., frames #10 and #11) to new buffers without overwriting the frozen round-robin buffer. In other words, starting from the trigger event, the post-triggered buffering may occur in such a way that a resulting buffer set is configured to cover both pre-triggered event frames (e.g., frames #5 to #8) and the post-triggered event frames (e.g., frame #9 and onward).

After the post-triggered buffering completes, the EDR may commence a readout phase. A readout phase may refer to the stage where the buffered data or information is accessed or retrieved, such as moved to a another (or a more permanent) storage. As discussed above, buffers are typically configured to temporarily store data while the data is being transferred or processed. During the readout phase, the buffered data is fetched and made available for further processing, transmission, or display. This phase may be important for ensuring that the data is accessed in the correct sequence and at the appropriate time according to the system's specifications. For example, as shown at 514, the EDR may complete the post-triggered buffering after frame #12 is buffered, and as shown at 516, the EDR may commence a readout phase, where frames #5 to #12 may be accessed and retrieved by another entity/software, such as moved to another storage device.

Then, as shown at 518, after the readout of the frozen buffer set is completed, the EDR may resume the rolling round-robin buffering (e.g., a maximum of four frames are continuously buffered as described in connection with 502, 504, and 506).

Figure 6:
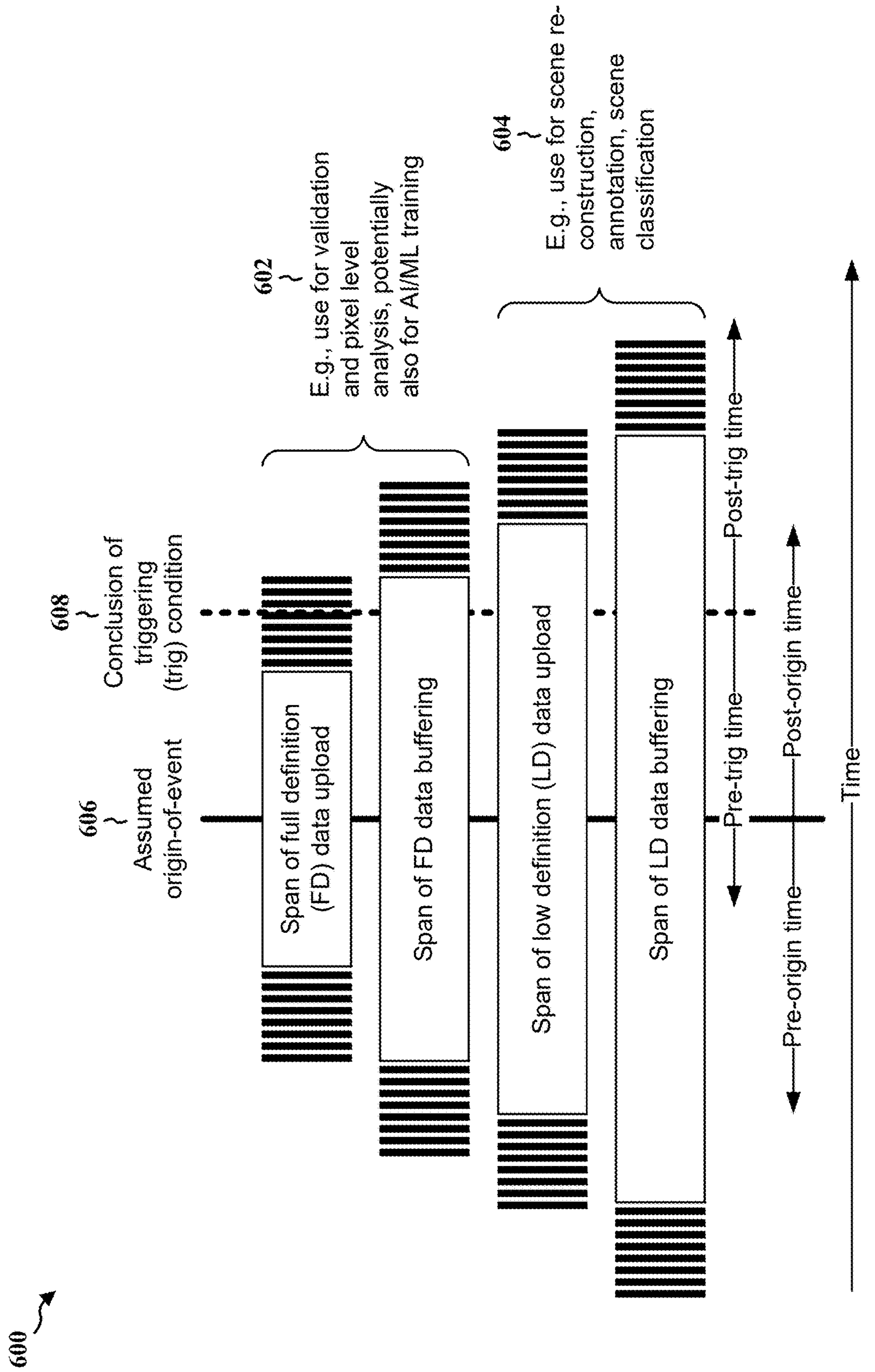
FIG. 6 is a diagram illustration an example event topology and infrastructure for a full definition event data recording (EDR) in accordance with various aspects of the present disclosure.

FIG. 6 is a diagram 600 illustration an example event topology and infrastructure for a full definition EDR in accordance with various aspects of the present disclosure. In some implementations, an EDR may have the capability to capture and store the frame/data in full-definition (FD) and low-definition (LD), which may be referred to as the "FD frame/data" and the "LD frame/data," respectively. FD frame/data and the LD frame/data may refer to the resolution and detail level of the frame/data captured during an event.

For example, FD frame/data may be captured with a higher resolution and/or finer time intervals (e.g., every 1 millisecond or 10 milliseconds) compared to LD frame data, and may records more detailed information about vehicle dynamics, crash parameters, and sensor outputs, etc. As shown at 602, FD frame/data may be used for validation and pixel level analysis, potentially also for AI/ML training, and in some instances, also used for detailed crash analysis and safety investigations. For example, FD frames may facilitate validation of existing software (SW) or improved SW version. If FD frames are combined with ground-truth (e.g., reconstructed from one or more other sensors, or using elaborate annotation techniques), re-training and/or re-tuning of CNN and CV functions may be accomplished.

On the other hand, LD frame/data may be captured with a lower resolution and/or coarser time intervals (e.g., every 100 milliseconds or more) compared to HD frame data. For example, as shown at 604, LD frames may be used for facilitating annotation of scenes where events and geometries evolving over a long time-span builds up to an event-of-interest (e.g., referring to an event that specifies using or accessing the stored frames), such as a lane change or approaching an intersections, and where the analysis of the event also specifies to include what happens after the event-of-interest. Given that detailed information may be available as the scene content approaches the vehicle.

In one example, assuming the "time of interest" and the "time of triggering event" are separated, and that span-of-interest for FD frames/data is limited. As shown at 606 and 608, there may typically be a time-difference between the real-world origin-of-event (such as a change of direction and speed of a dynamic object in the scene, e.g. a pedestrian) and the point-of-time where the criteria for freezing the buffers is triggered (e.g., the post-triggered buffering described in connection with FIG. 5). As discussed above, anomaly/trigger event analysis may specify buffering of frames (e.g. sensor image frames) that may be used by different pipeline steps. This may demand a lot of writing to the buffers which may stress the DRAM.

Aspects presented herein may improve the overall performance and efficiency of buffering, such as round-robin buffering for EDR. For example, in one aspect of the present disclosure, a scheme is provided that is capable of ensuring data received in a pipeline is written once, also in the cases where data is consumed both by a "regular real-time pipeline" and by "event data round-robin buffering." The advantage with this scheme is that no additional DRAM write bandwidth is consumed during nominal operation. The scheme also conserves the numbers of total buffers used, which may minimize the specified DRAM space allocated for the two purposes. In another aspect of the present disclosure, a scheme is provided that is capable of retaining a time-wise sparse set of buffer contents representing an extended time interval. This may be particularly meaningful/useful when, in the context of ADAS, identifying scenarios leading up to an incident or anomaly that does not specify dense time-sampling to facilitate annotation and re-construction of the event (e.g., the reconstruction may associate objects from also sparsely selected time-samples). In another aspect of the present disclosure, a scheme is provided that is capable of retaining a set of buffer contents with spatially down-sampled content. Spatial down-sampling (or pyramid level generation) may often be an inherent part of CNN processing, digital signal processing (DSP) processing, and/or CV-processing schemes. This means that no additional DRAM write-cycles (beyond what is used for the regular pipe-line) is used when extending the scheme to an EDR. In another aspect of the present disclosure, a scheme is provided where multiple pipelines subscribe to a stream of frames are using the stream of frames with a combination of design patterns, such as event buffering, pipelined perception, low level fusion systems, and/or reality augmentation, etc. Each pipeline subscriber may assign ownership to a buffer content by other associating a token or increasing a count (subscribing to buffer). A pool of buffers may then administrate the remaining subscription and return the buffers to the pool once there is no active subscriber left.

Figure 7:
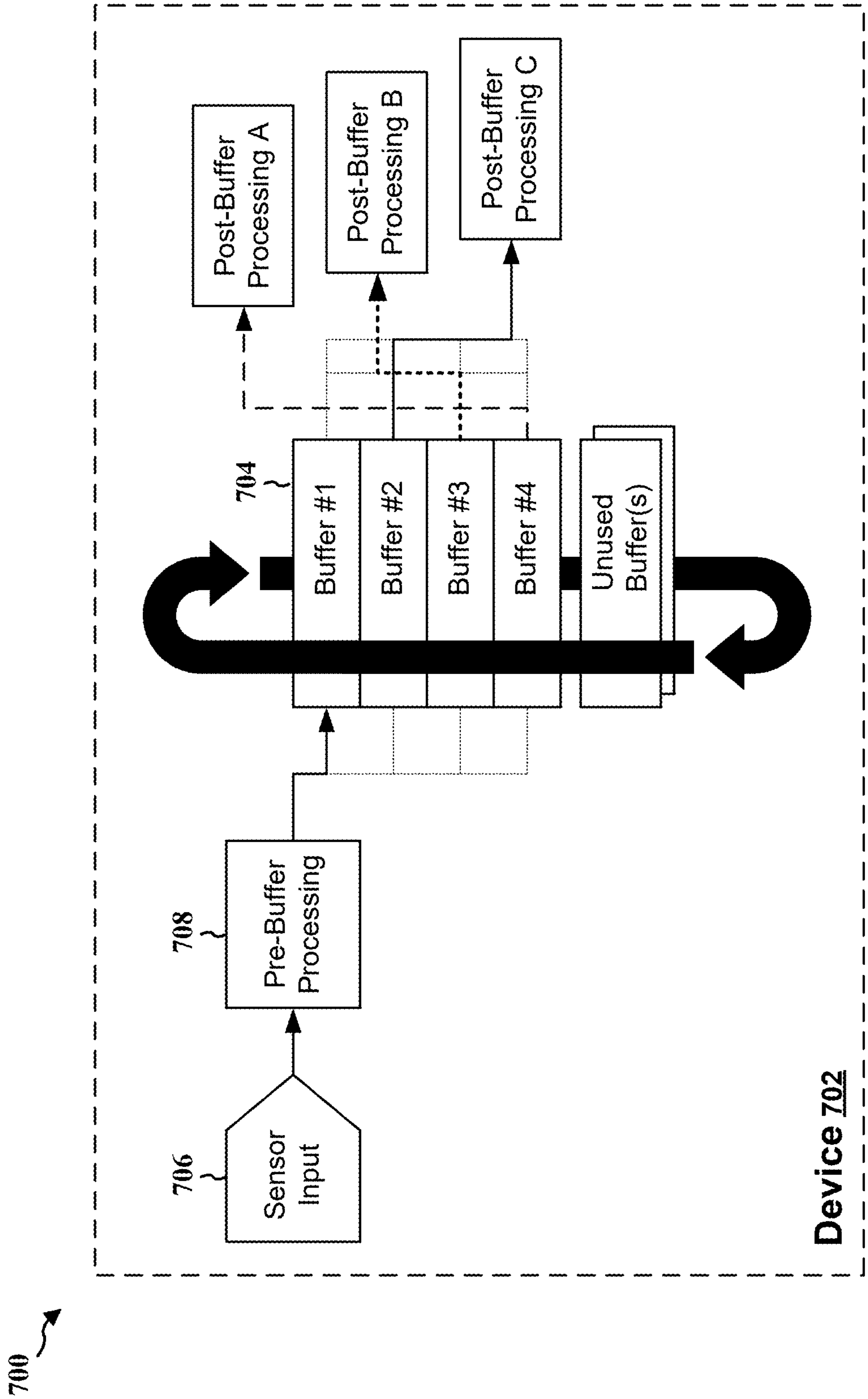
FIG. 7 is a diagram illustrating an example pipelined of a cyclic software (SW) stack in accordance with various aspects of the present disclosure.

FIG. 7 is a diagram 700 illustrating an example pipelined of a cyclic SW stack in accordance with various aspects of the present disclosure. As shown at 704, a device 702 (e.g., a UE, a vehicle system, an EDR system, etc.) may include a buffering system that has a set of buffers (e.g., buffers #1 to #4) allocated cyclically (i.e., meaning configured with round-robin buffering) for writing pre-processed frame(s) and for using the frame(s) for post-buffer processing in the pipeline configured for nominal function(s) (e.g., for perception, visualization, and/or driver assistance, etc.). For example, these four buffers may be configured to store frames from at least one sensor (e.g., from at least one camera) sequentially and in a cyclic manner. As an illustration, at 706, the device 702 may receive a set of (pre-processed) frames from the at least one sensor. At 708, the device may perform some pre-buffer processing to the set of preprocessed frames, and then buffer the set of set of preprocessed frames to the set of buffers (e.g., buffers #1 to #4) in a round-robin configuration/fashion, such as described in connection with FIG. 5.

Figure 8:
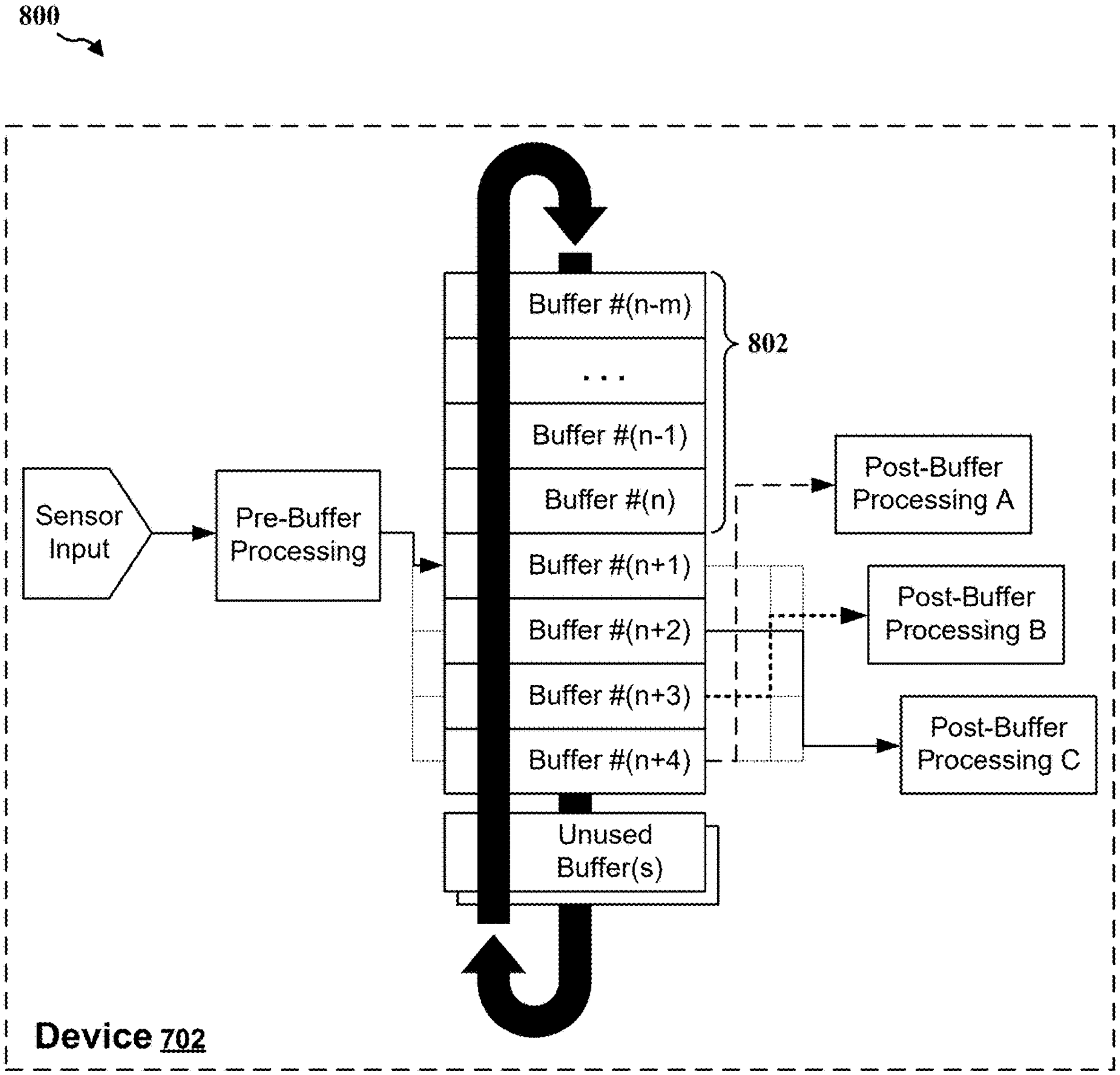
FIG. 8 is a diagram illustrating an example pipelined of a cyclic SW stack that is configured to retain buffer contents for a look-back purpose in accordance with various aspects of the present disclosure.

FIG. 8 is a diagram 800 illustrating an example pipelined of a cyclic SW stack that is configured to retain buffer contents for a look-back purpose in accordance with various aspects of the present disclosure. As shown at 802, in one aspect of the present disclosure, in addition to the set of buffers allocated cyclically for writing pre-processed frame and for using the frame for post-buffer processing in the pipeline used for nominal function(s), the buffering system of the device 702 may further include another set of buffers (e.g., buffer #(n−m) to #(n)) that is allocated and configured with a different, extended round-robin cycle to preserve previously processed frames, for purpose of later retrieval in the case a triggering event calls for storing and uploading the frames according to one of the event frame recording purposes (e.g., as described in connection with FIG. 5). For purposes of differentiation, this set of buffers may be referred to as the "look-back buffer(s)."

For example, assuming n=4 and m=3, buffers #5 to #8 may be allocated cyclically for writing pre-processed frame and for using the frame for post-buffer processing in the pipeline used for nominal function(s), and buffers #4 to #1 may be allocated to a different, extended round-robin cycle to preserve previously processed frames (i.e., buffers #4 to #1 are allocated as look-back buffers). The device 702 may be configured to process the pre-processed frames in buffers #5 to #8. After the pre-processed frames are processed (which may be referred to as the "previously processed frames" for purposes of differentiation), the previously processed frames may be re-addressed to buffers #4 to #1. As such, the frames preserved in buffers #4 to #1 may has a longer time span compared to the frames preserved in buffers #5 to #8, e.g., the time-span (e.g., a first time-span) for buffers #5 to #8 includes writing an unprocessed frame to a buffer and process the unprocessed frame, and the time-span (e.g., a second time-span) for buffers #4 to #1 includes writing an unprocessed frame to a buffer, process the unprocessed frame, and preserve the processed frame for an additional time. So, the second time-span may be longer than the first time-span.

Figure 9:
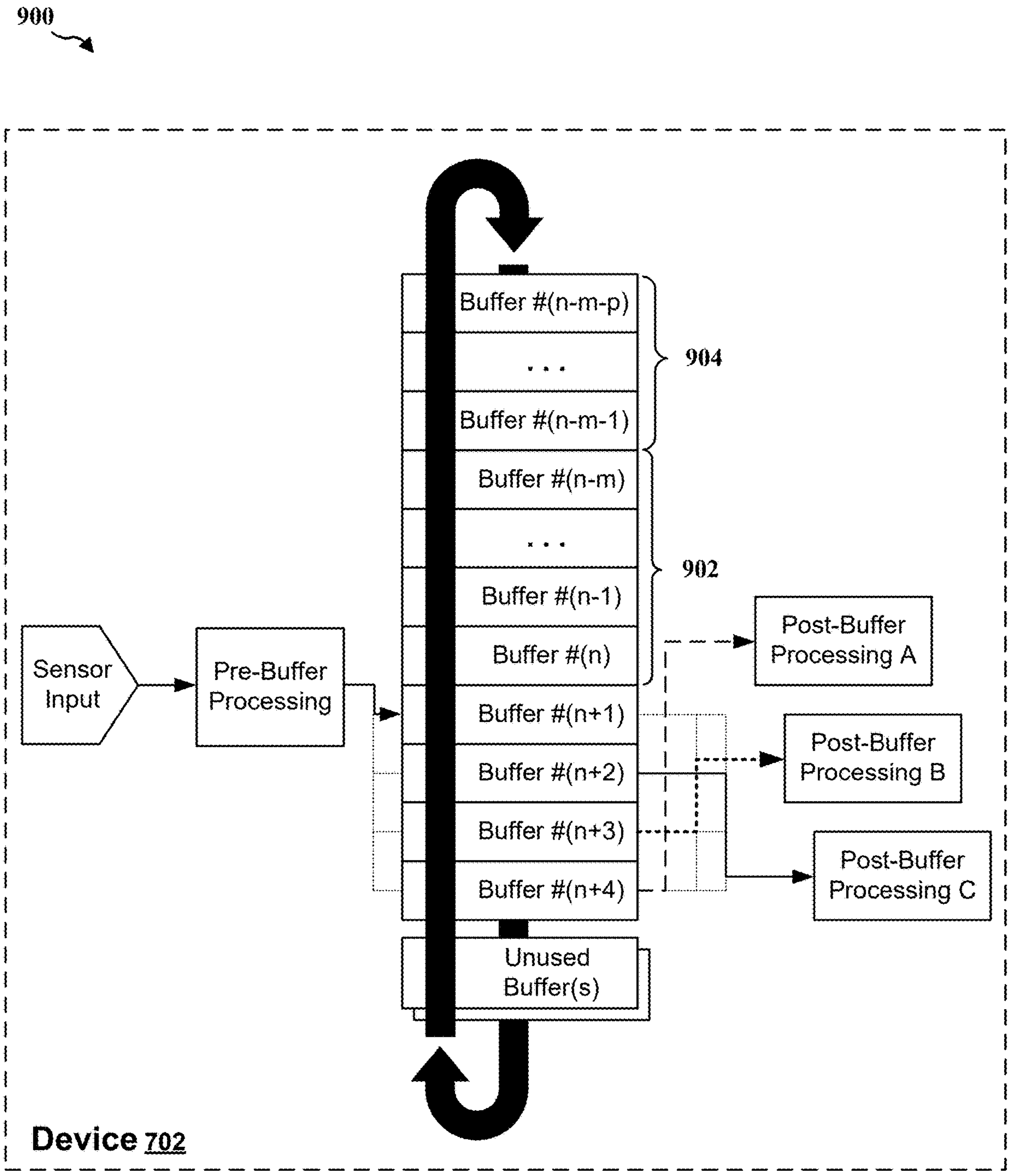
FIG. 9 is a diagram illustrating an example pipelined of a cyclic SW stack that is configured to keep a time-sparse set of look-back buffers to extend the addressable time-span in accordance with various aspects of the present disclosure.

FIG. 9 is a diagram 900 illustrating an example pipelined of a cyclic SW stack that is configured to keep a time-sparse set of look-back buffers to extend the addressable time-span in accordance with various aspects of the present disclosure. As shown at 902, in another aspect of the present disclosure, in addition to the set of buffers allocated cyclically for writing pre-processed frame and for using the frame for post-buffer processing in the pipeline used for nominal function(s), the buffering system of the device 702 may further include a first additional set of buffers (e.g., buffers #(n−m) to #(n)) that is allocated cyclically and configured to preserve previously processed frames with a temporally denser sampling interval (e.g., every frame, or every second frame). As shown at 904, the buffering system of the device 702 may also include a second additional set of buffers (e.g., buffers #(n−m−1) to #(n−m−p)) that is allocated (without copy of content, just change of allocation) from a subset of buffers in the first additional set of buffers (e.g., a set of buffers sparsely selected from the first additional set of buffers), where this subset of buffers may be configured with an extended preservation period and represent a temporal down-sampling. In other words, the second additional set of buffers may be configured to have a longer preservation period compared to the first additional set of buffers. Down-sampling may refer to a process of reducing the resolution or sampling rate of a signal, frame, or dataset by selecting fewer data points from the original. This technique may be implemented to reduce frame/data size, simplify processing, or match a desired output resolution.

For example, the first additional set of buffers (e.g., as shown at 902) may include 12 buffers (e.g., buffers #5 to #16, where n=16 and m=11), and the second additional set of buffers (e.g., as shown at 904) may include 4 buffers (e.g., buffers #1 to #4, where p=4). The 4 buffers in the second additional set of buffers may be sparsely selected from the first additional set of buffers (e.g., meaning the 4 buffers in the second additional set of buffers may be a subset of the first additional set of buffers). For example, buffer #1 in the second additional set of buffers may be selected from one of the buffers #5 to #7. Assuming buffer #5 is selected, the allocation of buffer #5 is then changed to buffer #1. Similarly, buffer #2 in the second additional set of buffers may be selected from one of the buffers #8 to #10. Assuming buffer #8 is selected, the allocation of buffer #8 is then changed to buffer #2. Similarly, buffer #3 in the second additional set of buffers may be selected from one of the buffers #11 to #13. Assuming buffer #13 is selected, the allocation of buffer #13 is then changed to buffer #3, etc.

Figure 10:
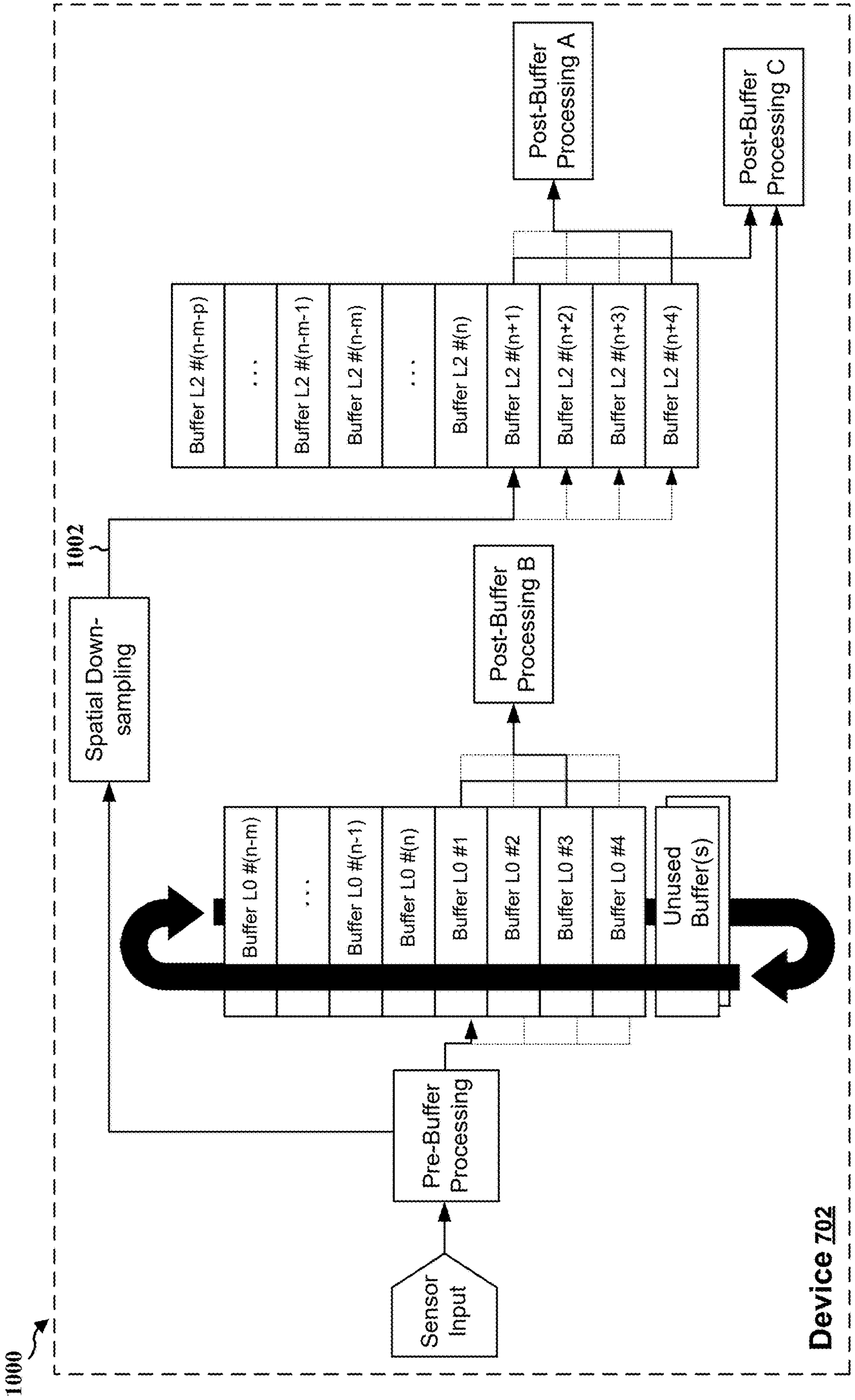
FIG. 10 is a diagram illustrating an example pipelined of a cyclic SW stack that is configured to retain multiple spatial down-samplings in tandem in accordance with various aspects of the present disclosure.

FIG. 10 is a diagram 1000 illustrating an example pipelined of a cyclic SW stack that is configured to retain multiple spatial down-samplings in tandem in accordance with various aspects of the present disclosure. As shown at 1002, in another aspect of the present disclosure, the device 702 or the buffering system of the device 702 may be configured to keep/store a set of down-sampled frames (e.g., denoted with "L2") in parallel with a set of high-resolution frames (e.g., denoted with "L0") (even if the set of down-sampled frames may be re-generated from the set of high-resolution frames via post-processing) to allow for a temporally sparse set of buffers to be kept without additional memory transfer overheads.

Figure 11:
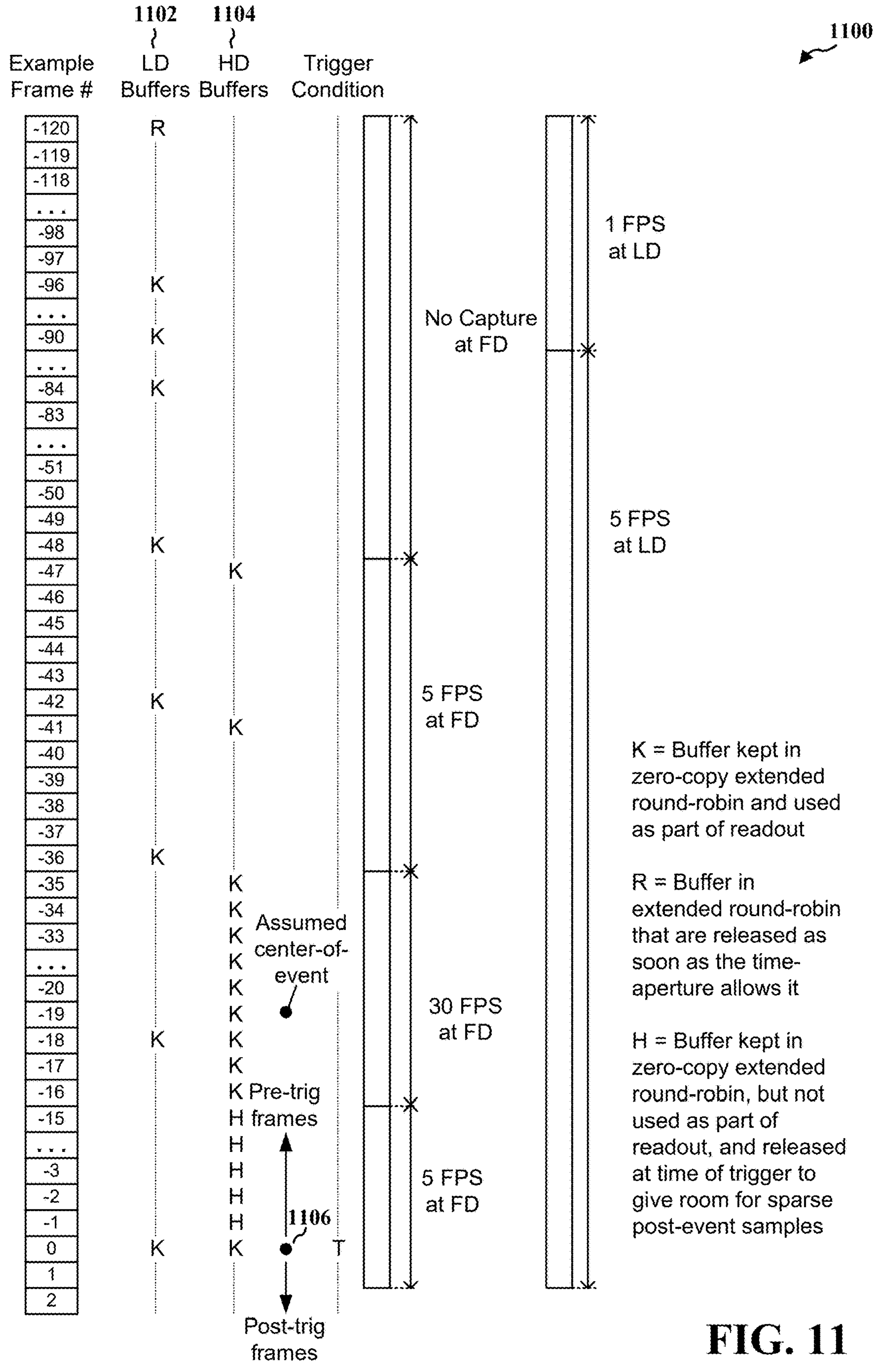
FIG. 11 is a diagram illustrating an example timing diagram depicting a series of enumerated incoming frames in accordance with various aspects of the present disclosure.

FIG. 11 is a diagram 1100 illustrating an example timing diagram depicting a series of enumerated incoming frames in accordance with various aspects of the present disclosure. In one example, as shown at 1102 and 1104, FD and LD frames may be configured to be buffered at different resolution. For example, the FD/LD frames may be buffered at the temporal resolution of 1 frame per second (FPS), 5 FPS, or 30 FPS. Frames that are identified by the letter "K" are configured to be retained (beyond their use in the regular pipeline). When a specific frame identified is no longer covered by the retention condition, it may no longer be kept. As shown at 1106, a trigger condition may represent a hypothesized time-of-freeze, from which time point future K-marked buffers are still captured, but the release (and subsequent overwriting/re-use) of old K-marked buffers is inhibited to achieve the pre-buffering and the post-buffering.

Aspects presented herein may improve the overall performance and efficiency of buffering, such as round-robin buffering for EDR. For example, in one aspect of the present disclosure, redundant writes by DRAM for regular real-time pipe-line and by EDR round-robin buffering may be eliminated by ensuring that such data is written just once. In another aspect of the present disclosure, a sparser set of buffer entries may be used in ADAS scenarios where dense time-sampling to facilitate annotation and re-construction of an event is not specified. In another aspect of the present disclosure, a set of buffer contents with spatially down-sampled content may be used for an ADAS event.

Figure 12:
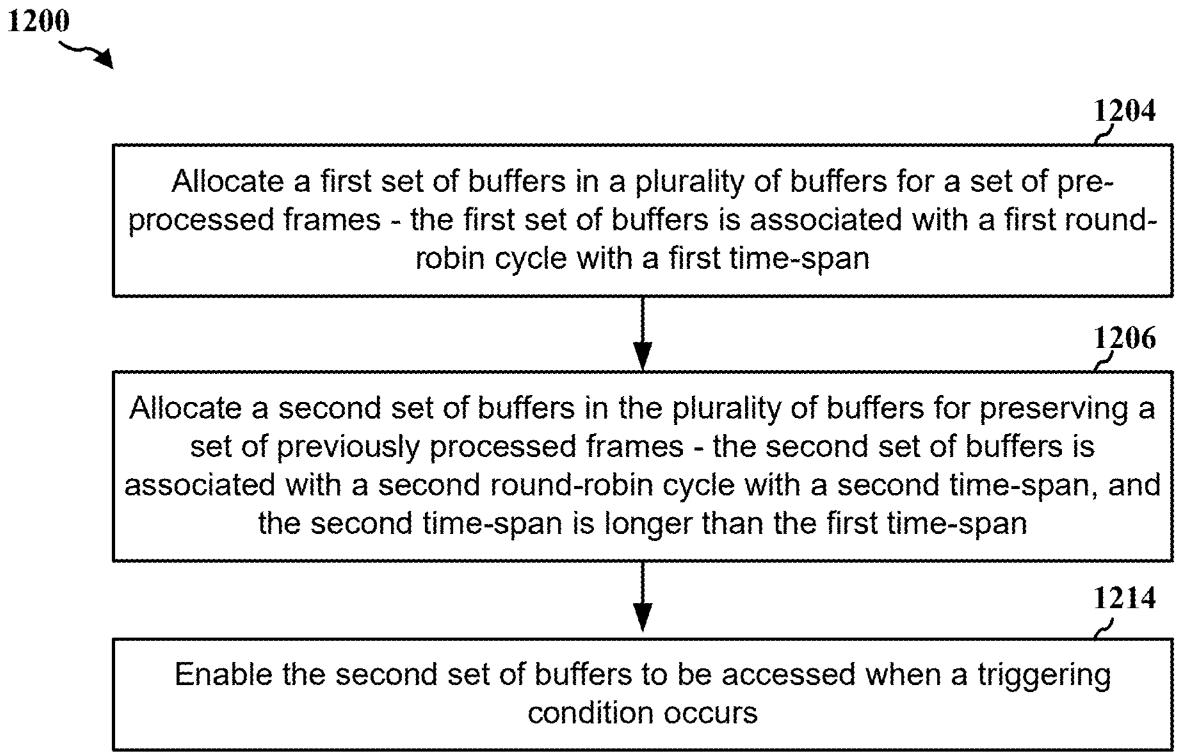
FIG. 12 is a flowchart of a method of buffering.

FIG. 12 is a flowchart 1200 of a method of buffering. The method may be performed by a device (e.g., the UE 104, 402; the device 702; the apparatus 1404). The method may enable the device to write received data just once when the received data is consumed both by a regular real-time pipe-line and by an event data recording round-robin buffering, thereby reducing additional DRAM write bandwidth consumed during nominal operation(s).

At 1204, the device may allocate a first set of buffers in a plurality of buffers for a set of pre-processed frames, where the first set of buffers is associated with a first round-robin cycle with a first time-span, such as described in connection with FIGS. 7 to 11. For example, as discussed in connection with 704 of FIG. 7, a device 702 (e.g., a UE, a vehicle system, an EDR system, etc.) may include a buffering system that has a set of buffers (e.g., buffers #1 to #4) allocated cyclically (i.e., meaning configured with round-robin buffering) for writing pre-processed frame(s) and for using the frame(s) for post-buffer processing in the pipeline used for nominal function(s) (e.g., for perception, visualization, and/or driver assistance, etc.). The allocation of the first set of buffers may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

At 1206, the device may allocate a second set of buffers in the plurality of buffers for preserving a set of previously processed frames, where the second set of buffers is associated with a second round-robin cycle with a second time-span, such as described in connection with FIGS. 7 to 11. For example, as discussed in connection with 802 of FIG. 8, in addition to the set of buffers allocated cyclically for writing pre-processed frame and for using the frame for post-buffer processing in the pipeline used for nominal function(s), the buffering system of the device 702 may further include another set of buffers (e.g., buffer #(n−m) to #(n)) that is allocated and configured with a different, extended round-robin cycle to preserve previously processed frames, for purpose of later retrieval in the case a triggering event calls for storing and uploading the frames according to one of the event frame recording purposes (e.g., as described in connection with FIG. 5). The allocation of the second set of buffers may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

At 1214, the device may enable the second set of buffers to be accessed when a triggering condition occurs, such as described in connection with FIGS. 7 to 11. For example, as discussed in connection with 802 of FIG. 8, in addition to the set of buffers allocated cyclically for writing pre-processed frame and for using the frame for post-buffer processing in the pipeline used for nominal function(s), the buffering system of the device 702 may further include another set of buffers (e.g., buffer #(n-m) to #(n)) that is allocated and configured with a different, extended round-robin cycle to preserve previously processed frames, for purpose of later retrieval in the case a triggering event calls for storing and uploading the frames according to one of the event frame recording purposes (e.g., as described in connection with FIG. 5). The enablement of the second set of buffers to be accessed when a triggering condition occurs may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

In one example, the device may process the set of pre-processed frames in the first set of buffers to obtain the set of previously processed frames, and re-address the set of previously processed frames to the second set of buffers, such as described in connection with FIGS. 7 to 11. For example, as discussed in connection with 802 of FIG. 8, the device 702 may be configured to process the pre-processed frames in buffers #5 to #8. After the pre-processed frames are processed (which may be referred to as the "previously processed frames" for purposes of differentiation), the previously processed frames may be copied or re-addressed to buffers #4 to #1. The processing of the set of pre-processed frames and/or the re-addressing of the set of previously processed frames may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

In another example, the device may allocate a third set of buffers in the plurality of buffers for preserving the set of previously processed frames with a second sampling interval, where the second set of buffers is configured to preserve the set of previously processed frames with a first sampling interval, and the first sampling interval is temporally denser than the second sampling interval, such as described in connection with FIGS. 7 to 11. For example, as discussed in connection with 902 of FIG. 7, in addition to the set of buffers allocated cyclically for writing pre-processed frame and for using the frame for post-buffer processing in the pipeline used for nominal function(s), the buffering system of the device 702 may further include a first additional set of buffers (e.g., buffers #(n−m) to #(n)) that is allocated cyclically and configured to preserve previously processed frames with a temporally denser sampling interval (e.g., every frame, or every second frame). As shown at 904, the buffering system of the device 702 may also include a second additional set of buffers (e.g., buffers #(n−m−1) to #(n−m−p)) that is allocated (without copy of content, just change of allocation) from a subset of buffers in the first additional set of buffers (e.g., a set of buffers sparsely selected from the first additional set of buffers), where this subset of buffers may be configured with an extended preservation period and represent a temporal down-sampling. In other words, the second additional set of buffers may be configured to have a longer preservation period compared to the first additional set of buffers. The allocation of the third set of buffers may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14. In some implementations, the third set of buffers is associated with a third round-robin cycle with a third time-span, where the third time-span is longer than the second time-span. In some implementations, to allocate the third set of buffers in the plurality of buffers for preserving the set of previously processed frames with the second sampling interval, the device may be configured to sparsely select a subset of previously processed frames from the set of previously processed frames, and change buffer allocation of the subset of previously processed frames to the third set of buffers.

In another example, the device may store the set of pre-processed frames to the first set of buffers, down-sample the set of pre-processed frames to obtain a set of down-sampled pre-processed frames, and store, in parallel to storing the set of pre-processed frames to the first set of buffers, the set of down-sampled pre-processed frames to a third set of buffers, such as described in connection with FIGS. 7 to 11. For example, as discussed in connection with 1002 of FIG. 10, the device 702 or the buffering system of the device 702 may be configured to keep/store a set of down-sampled frames (e.g., denoted with "L2") in parallel with a set of high-resolution frames (e.g., denoted with "L0") (even if the set of down-sampled frames may be re-generated from the set of high-resolution frames via post-processing) to allow for a temporally sparse set of buffers to be kept without additional memory transfer overheads. The storing of the set of pre-processed frames, the down-sampling of the set of pre-processed frames, and/or the storing of the set of down-sampled pre-processed frames may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14. In some implementations, the set of pre-processed frames corresponds to a set of pre-processed HD frames, and the set of down-sampled pre-processed frames corresponds to a set of pre-processed LD frames.

In another example, the device may receive, from at least one camera, the set of pre-processed frames, such as described in connection with FIGS. 7 to 11. For example, as discussed in connection with 706 of FIG. 7, the device 702 may receive a set of (pre-processed) frames from the at least one sensor. At 708, the device may perform some pre-buffer processing to the set of preprocessed frames, and then buffer the set of set of preprocessed frames to the set of buffers (e.g., buffers #1 to #4) in a round-robin configuration/fashion. The reception of the set of pre-processed frames may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

In another example, the device may receive an indication of the triggering condition.

In another example, the triggering condition corresponds to an event data recording (EDR) triggering event.

In another example, the first set of buffers is used for a set of nominal functions, and the second set of buffers is used for EDR. In some implementations, the set of nominal functions includes at least one of: a perception function, a visualization function, or a driver assistance function.

Figure 13:
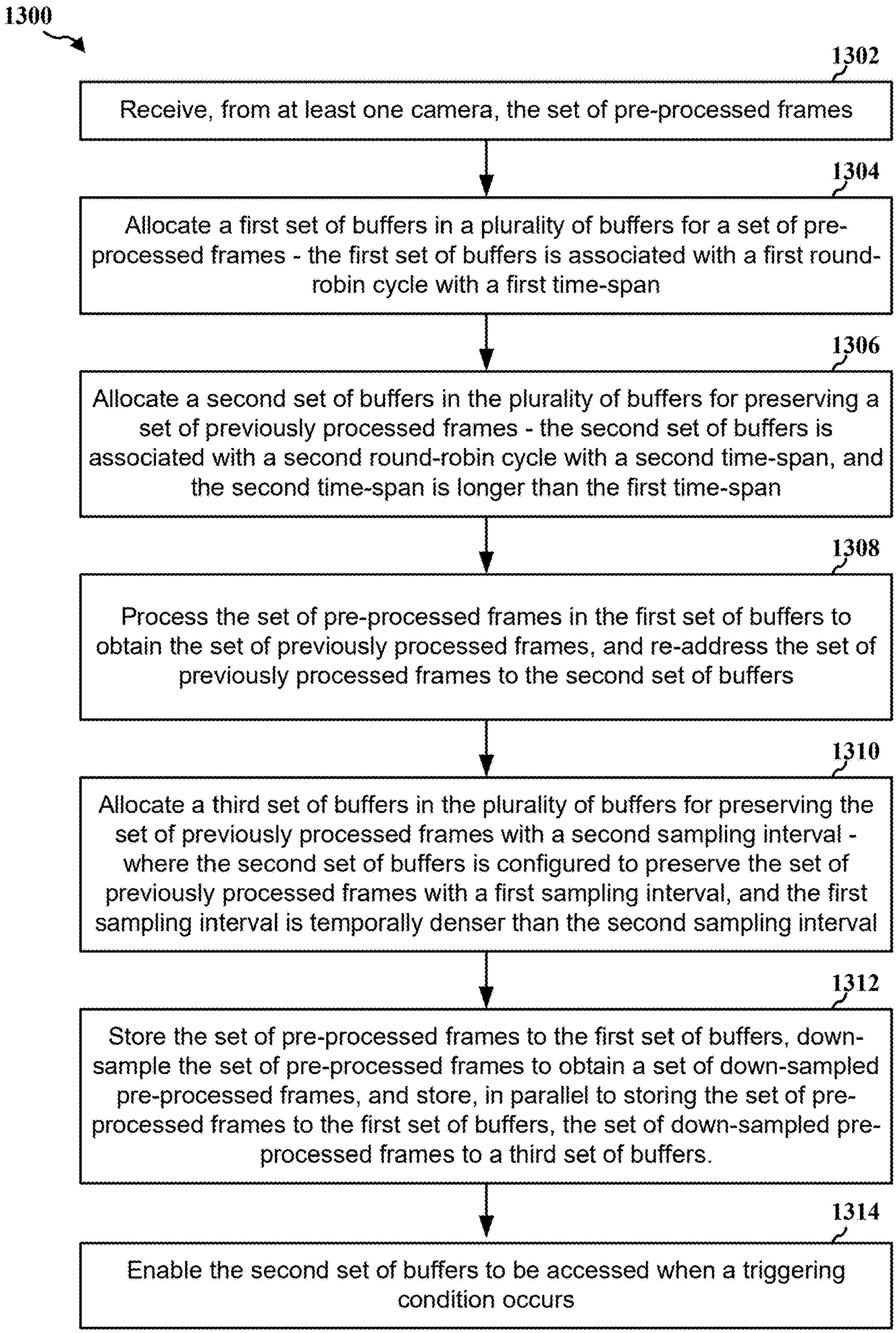
FIG. 13 is a flowchart of a method of buffering.

FIG. 13 is a flowchart 1300 of a method of buffering. The method may be performed by a device (e.g., the UE 104, 402; the device 702; the apparatus 1404). The method may enable the device to write received data just once when the data is consumed both by a regular real-time pipe-line and by an event data recording round-robin buffering, thereby reducing additional DRAM write bandwidth consumed during nominal operation(s).

At 1304, the device may allocate a first set of buffers in a plurality of buffers for a set of pre-processed frames, where the first set of buffers is associated with a first round-robin cycle with a first time-span, such as described in connection with FIGS. 7 to 11. For example, as discussed in connection with 704 of FIG. 7, a device 702 (e.g., a UE, a vehicle system, an EDR system, etc.) may include a buffering system that has a set of buffers (e.g., buffers #1 to #4) allocated cyclically (i.e., meaning configured with round-robin buffering) for writing pre-processed frame(s) and for using the frame(s) for post-buffer processing in the pipeline used for nominal function(s) (e.g., for perception, visualization, and/or driver assistance, etc.). The allocation of the first set of buffers may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

At 1306, the device may allocate a second set of buffers in the plurality of buffers for preserving a set of previously processed frames, where the second set of buffers is associated with a second round-robin cycle with a second time-span, such as described in connection with FIGS. 7 to 11. For example, as discussed in connection with 802 of FIG. 8, in addition to the set of buffers allocated cyclically for writing pre-processed frame and for using the frame for post-buffer processing in the pipeline used for nominal function(s), the buffering system of the device 702 may further include another set of buffers (e.g., buffer #(n−m) to #(n)) that is allocated and configured with a different, extended round-robin cycle to preserve previously processed frames, for purpose of later retrieval in the case a triggering event calls for storing and uploading the frames according to one of the event frame recording purposes (e.g., as described in connection with FIG. 5). The allocation of the second set of buffers may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

At 1314, the device may enable the second set of buffers to be accessed when a triggering condition occurs, such as described in connection with FIGS. 7 to 11. For example, as discussed in connection with 802 of FIG. 8, in addition to the set of buffers allocated cyclically for writing pre-processed frame and for using the frame for post-buffer processing in the pipeline used for nominal function(s), the buffering system of the device 702 may further include another set of buffers (e.g., buffer #(n−m) to #(n)) that is allocated and configured with a different, extended round-robin cycle to preserve previously processed frames, for purpose of later retrieval in the case a triggering event calls for storing and uploading the frames according to one of the event frame recording purposes (e.g., as described in connection with FIG. 5). The enablement of the second set of buffers to be accessed when a triggering condition occurs may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

In one example, as shown at 1308, the device may process the set of pre-processed frames in the first set of buffers to obtain the set of previously processed frames, and re-address the set of previously processed frames to the second set of buffers, such as described in connection with FIGS. 7 to 11. For example, as discussed in connection with 802 of FIG. 8, the device 702 may be configured to process the pre-processed frames in buffers #5 to #8. After the pre-processed frames are processed (which may be referred to as the "previously processed frames" for purposes of differentiation), the previously processed frames may be copied or re-addressed to buffers #4 to #1. The processing of the set of pre-processed frames and/or the re-addressing of the set of previously processed frames may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

In another example, as shown at 1310, the device may allocate a third set of buffers in the plurality of buffers for preserving the set of previously processed frames with a second sampling interval, where the second set of buffers is configured to preserve the set of previously processed frames with a first sampling interval, and the first sampling interval is temporally denser than the second sampling interval, such as described in connection with FIGS. 7 to 11. For example, as discussed in connection with 902 of FIG. 7, in addition to the set of buffers allocated cyclically for writing pre-processed frame and for using the frame for post-buffer processing in the pipeline used for nominal function(s), the buffering system of the device 702 may further include a first additional set of buffers (e.g., buffers #(n−m) to #(n)) that is allocated cyclically and configured to preserve previously processed frames with a temporally denser sampling interval (e.g., every frame, or every second frame). As shown at 904, the buffering system of the device 702 may also include a second additional set of buffers (e.g., buffers #(n−m−1) to #(n−m−p)) that is allocated (without copy of content, just change of allocation) from a subset of buffers in the first additional set of buffers (e.g., a set of buffers sparsely selected from the first additional set of buffers), where this subset of buffers may be configured with an extended preservation period and represent a temporal down-sampling. In other words, the second additional set of buffers may be configured to have a longer preservation period compared to the first additional set of buffers. The allocation of the third set of buffers may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14. In some implementations, the third set of buffers is associated with a third round-robin cycle with a third time-span, where the third time-span is longer than the second time-span. In some implementations, to allocate the third set of buffers in the plurality of buffers for preserving the set of previously processed frames with the second sampling interval, the device may be configured to sparsely select a subset of previously processed frames from the set of previously processed frames, and change buffer allocation of the subset of previously processed frames to the third set of buffers.

In another example, as shown at 1312, the device may store the set of pre-processed frames to the first set of buffers, down-sample the set of pre-processed frames to obtain a set of down-sampled pre-processed frames, and store, in parallel to storing the set of pre-processed frames to the first set of buffers, the set of down-sampled pre-processed frames to a third set of buffers, such as described in connection with FIGS. 7 to 11. For example, as discussed in connection with 1002 of FIG. 10, the device 702 or the buffering system of the device 702 may be configured to keep/store a set of down-sampled frames (e.g., denoted with “L2”) in parallel with a set of high-resolution frames (e.g., denoted with “L0”) (even if the set of down-sampled frames may be re-generated from the set of high-resolution frames via post-processing) to allow for a temporally sparse set of buffers to be kept without additional memory transfer overheads. The storing of the set of pre-processed frames, the down-sampling of the set of pre-processed frames, and/or the storing of the set of down-sampled pre-processed frames may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14. In some implementations, the set of pre-processed frames corresponds to a set of pre-processed HD frames, and the set of down-sampled pre-processed frames corresponds to a set of pre-processed LD frames.

In another example, as shown at 1302, the device may receive, from at least one camera, the set of pre-processed frames, such as described in connection with FIGS. 7 to 11. For example, as discussed in connection with 706 of FIG. 7, the device 702 may receive a set of (pre-processed) frames from the at least one sensor. At 708, the device may perform some pre-buffer processing to the set of preprocessed frames, and then buffer the set of set of preprocessed frames to the set of buffers (e.g., buffers #1 to #4) in a round-robin configuration/fashion. The reception of the set of pre-processed frames may be performed by, e.g., the buffer allocation component 198, the one or more ECUs 1434, the camera 1432, the one or more sensors 1418, the transceiver(s) 1422, the cellular baseband processor(s) 1424, and/or the application processor(s) 1406 of the apparatus 1404 in FIG. 14.

In another example, the device may receive an indication of the triggering condition.

In another example, the triggering condition corresponds to an event data recording (EDR) triggering event.

In another example, the first set of buffers is used for a set of nominal functions, and the second set of buffers is used for EDR. In some implementations, the set of nominal functions includes at least one of: a perception function, a visualization function, or a driver assistance function.

Figure 14:
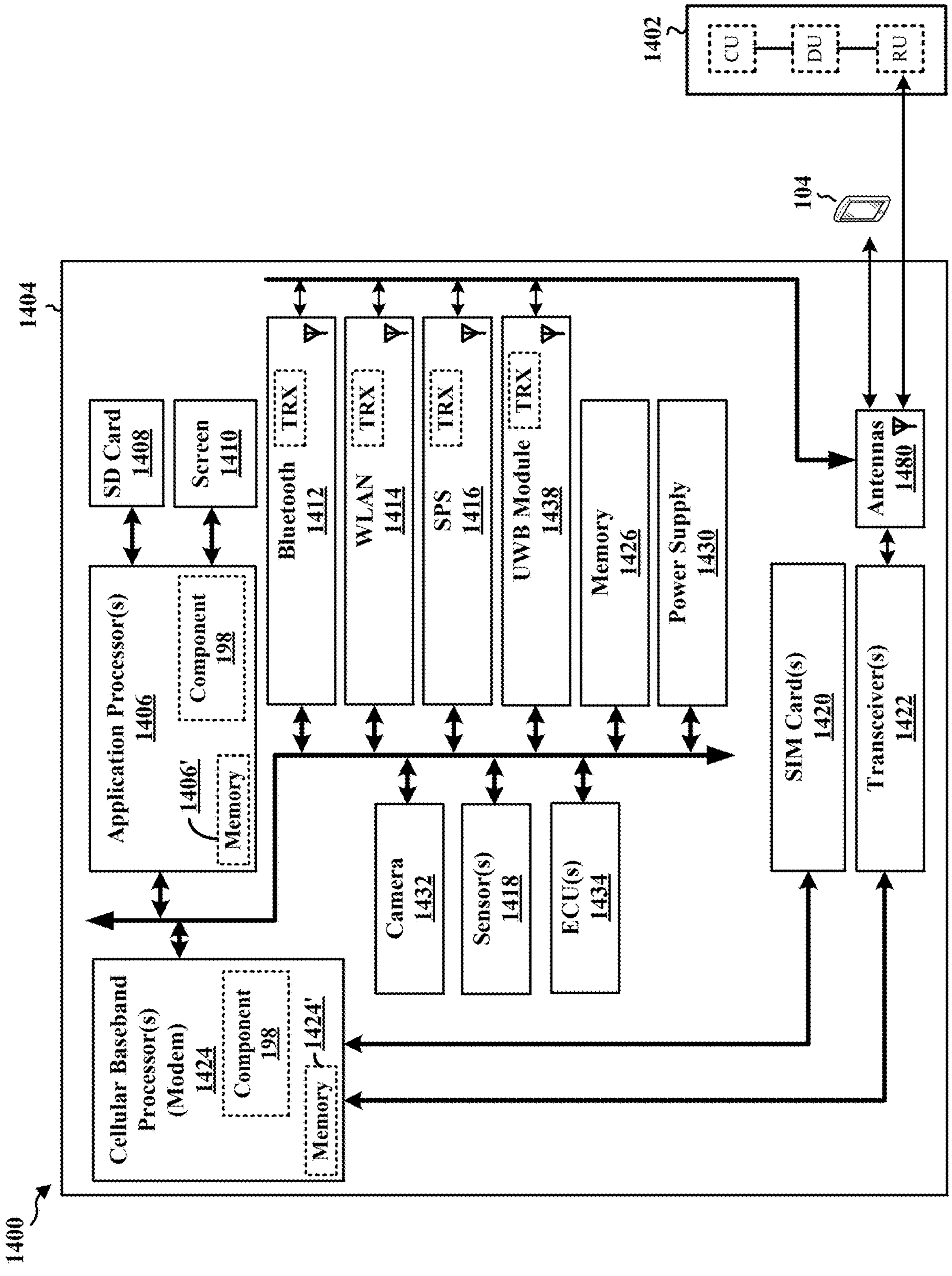
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an ultrawide band (UWB) module 1438, an SPS module 1416 (e.g., GNSS module), one or more sensors 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, a camera 1432, and/or one or more electronic control units (ECUs) 1434. The Bluetooth module 1412, the UWB module 1438, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the buffer allocation component 198 may be configured to allocate a first set of buffers in a plurality of buffers for a set of pre-processed frames, where the first set of buffers is associated with a first round-robin cycle with a first time-span. The buffer allocation component 198 may also be configured to allocate a second set of buffers in the plurality of buffers for preserving a set of previously processed frames, where the second set of buffers is associated with a second round-robin cycle with a second time-span. The buffer allocation component 198 may also be configured to enable the second set of buffers to be accessed when a triggering condition occurs. The buffer allocation component 198 may be within the cellular baseband processor(s) 1424, the application processor(s) 1406, or both the cellular baseband processor(s) 1424 and the application processor(s) 1406. The buffer allocation component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for allocating a first set of buffers in a plurality of buffers for a set of pre-processed frames, where the first set of buffers is associated with a first round-robin cycle with a first time-span. The apparatus 1404 may further include means for allocating a second set of buffers in the plurality of buffers for preserving a set of previously processed frames, where the second set of buffers is associated with a second round-robin cycle with a second time-span. The apparatus 1404 may further include means for enabling the second set of buffers to be accessed when a triggering condition occurs.

In one configuration, the apparatus 1404 may further include means for processing the set of pre-processed frames in the first set of buffers to obtain the set of previously processed frames, and means for re-addressing the set of previously processed frames to the second set of buffers.

In another configuration, the apparatus 1404 may further include means for allocating a third set of buffers in the plurality of buffers for preserving the set of previously processed frames with a second sampling interval, where the second set of buffers is configured to preserve the set of previously processed frames with a first sampling interval, and the first sampling interval is temporally denser than the second sampling interval. In some implementations, the third set of buffers is associated with a third round-robin cycle with a third time-span, where the third time-span is longer than the second time-span. In some implementations, the means for allocating the third set of buffers in the plurality of buffers for preserving the set of previously processed frames with the second sampling interval may include configuring the apparatus 1404 to sparsely select a subset of previously processed frames from the set of previously processed frames, and change buffer allocation of the subset of previously processed frames to the third set of buffers.

In another configuration, the apparatus 1404 may further include means for storing the set of pre-processed frames to the first set of buffers, means for down-sampling the set of pre-processed frames to obtain a set of down-sampled pre-processed frames, and means for storing, in parallel to storing the set of pre-processed frames to the first set of buffers, the set of down-sampled pre-processed frames to a third set of buffers. In some implementations, the set of pre-processed frames corresponds to a set of pre-processed HD frames, and the set of down-sampled pre-processed frames corresponds to a set of pre-processed LD frames.

In another configuration, the apparatus 1404 may further include means for receiving, from at least one camera, the set of pre-processed frames.

In another configuration, the apparatus 1404 may further include means for receiving an indication of the triggering condition.

In another configuration, the triggering condition corresponds to an EDR triggering event.

In another configuration, the first set of buffers is used for a set of nominal functions, and the second set of buffers is used for EDR. In some implementations, the set of nominal functions includes at least one of: a perception function, a visualization function, or a driver assistance function.

The means may be the buffer allocation component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor (i.e., a set of one or more processors P) is configured to perform a set of functions F, each processor of P may be configured to perform a subset S of F, where $S \subseteq F$. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method at a device, comprising: allocating a first set of buffers in a plurality of buffers for a set of pre-processed frames, wherein the first set of buffers is associated with a first round-robin cycle with a first time-span; allocating a second set of buffers in the plurality of buffers for preserving a set of previously processed frames, wherein the second set of buffers is associated with a second round-robin cycle with a second time-span, wherein the second time-span is longer than the first time-span; and enabling the second set of buffers to be accessed when a triggering condition occurs.

Aspect 2 is the method of aspect 1, further comprising: receiving an indication of the triggering condition.

Aspect 3 is the method of aspect 1 or aspect 2, further comprising: processing the set of pre-processed frames in the first set of buffers to obtain the set of previously processed frames; and re-addressing the set of previously processed frames to the second set of buffers.

Aspect 4 is the method of any of aspects 1 to 3, wherein the second set of buffers is configured to preserve the set of previously processed frames with a first sampling interval, the method further comprises: allocating a third set of buffers in the plurality of buffers for preserving the set of previously processed frames with a second sampling interval, wherein the first sampling interval is temporally denser than the second sampling interval.

Aspect 5 is the method of any of aspects 1 to 4, wherein the third set of buffers is associated with a third round-robin cycle with a third time-span, wherein the third time-span is longer than the second time-span.

Aspect 6 is the method of any of aspects 1 to 5, wherein allocating the third set of buffers in the plurality of buffers for preserving the set of previously processed frames with the second sampling interval comprises: sparsely selecting a subset of previously processed frames from the set of previously processed frames; and changing buffer allocation of the subset of previously processed frames to the third set of buffers.

Aspect 7 is the method of any of aspects 1 to 6, further comprising: storing the set of pre-processed frames to the first set of buffers; down-sampling the set of pre-processed frames to obtain a set of down-sampled pre-processed frames; and storing, in parallel to storing the set of pre-processed frames to the first set of buffers, the set of down-sampled pre-processed frames to a third set of buffers.

Aspect 8 is the method of any of aspects 1 to 7, wherein the set of pre-processed frames corresponds to a set of pre-processed high-definition (HD) frames, and wherein the set of down-sampled pre-processed frames corresponds to a set of pre-processed low-definition (LD) frames.

Aspect 9 is the method of any of aspects 1 to 8, wherein the triggering condition corresponds to an event data recording (EDR) triggering event.

Aspect 10 is the method of any of aspects 1 to 9, further comprising: receiving, from at least one camera, the set of pre-processed frames.

Aspect 11 is the method of any of aspects 1 to 10, wherein the first set of buffers is used for a set of nominal functions, and the second set of buffers is used for event data recording (EDR).

Aspect 12 is the method of any of aspects 1 to 11, wherein the set of nominal functions includes at least one of: a perception function, a visualization function, or a driver assistance function.

Aspect 13 is an apparatus at a device, including: at least one memory; and at least one processor coupled to the at least one memory and, based at least in part on information stored in the at least one memory, the at least one processor is configured to implement any of aspects 1 to 12.

Aspect 14 is the apparatus of aspect 13, further including at least one transceiver coupled to the at least one processor.

Aspect 15 is an apparatus at a device, including means for implementing any of aspects 1 to 12.

Aspect 16 is a computer-readable medium (e.g., a non-transitory computer-readable medium) storing computer executable code, where the code when executed by a processor causes the processor to implement any of aspects 1 to 12.

What is claimed is:

1. An apparatus at a device, comprising:

at least one memory; and at least one processor coupled to the at least one memory, wherein the at least one processor is configured to:

allocate a first set of buffers in a plurality of buffers for a set of pre-processed frames, wherein the first set of buffers is associated with a first round-robin cycle with a first time-span;

allocate a second set of buffers in the plurality of buffers for preserving a set of previously processed frames, wherein the second set of buffers is associated with a second round-robin cycle with a second time-span; and enable the second set of buffers to be accessed when a triggering condition occurs.

2. The apparatus of claim 1, wherein the at least one processor is further configured to:

receive an indication of the triggering condition.

3. The apparatus of claim 1, wherein the at least one processor is further configured to:

process the set of pre-processed frames in the first set of buffers to obtain the set of previously processed frames; and re-address the set of previously processed frames to the second set of buffers.

4. The apparatus of claim 1, wherein the second set of buffers is configured to preserve the set of previously processed frames with a first sampling interval, and wherein the at least one processor is further configured to:

allocate a third set of buffers in the plurality of buffers for preserving the set of previously processed frames with a second sampling interval, wherein the first sampling interval is temporally denser than the second sampling interval.

5. The apparatus of claim 4, wherein the third set of buffers is associated with a third round-robin cycle with a third time-span, wherein the third time-span is longer than the second time-span.

6. The apparatus of claim 4, wherein to allocate the third set of buffers in the plurality of buffers for preserving the set of previously processed frames with the second sampling interval, the at least one processor is configured to:

sparsely select a subset of previously processed frames from the set of previously processed frames; and change buffer allocation of the subset of previously processed frames to the third set of buffers.

7. The apparatus of claim 1, wherein the at least one processor is further configured to:

store the set of pre-processed frames to the first set of buffers;

down-sample the set of pre-processed frames to obtain a set of down-sampled pre-processed frames; and store, in parallel to storing the set of pre-processed frames to the first set of buffers, the set of down-sampled pre-processed frames to a third set of buffers.

8. The apparatus of claim 7, wherein the set of pre-processed frames corresponds to a set of pre-processed high-definition (HD) frames, and wherein the set of down-sampled pre-processed frames corresponds to a set of pre-processed low-definition (LD) frames.

9. The apparatus of claim 1, wherein the triggering condition corresponds to an event data recording (EDR) triggering event.

10. The apparatus of claim 1, wherein the at least one processor is further configured to:

receive, from at least one camera, the set of pre-processed frames.

11. The apparatus of claim 1, wherein the first set of buffers is used for a set of nominal functions, and the second set of buffers is used for event data recording (EDR).

12. The apparatus of claim 11, wherein the set of nominal functions includes at least one of: a perception function, a visualization function, or a driver assistance function.

13. A method at a device, comprising:

allocating a first set of buffers in a plurality of buffers for a set of pre-processed frames, wherein the first set of buffers is associated with a first round-robin cycle with a first time-span;

allocating a second set of buffers in the plurality of buffers for preserving a set of previously processed frames, wherein the second set of buffers is associated with a second round-robin cycle with a second time-span, wherein the second time-span is longer than the first time-span; and enabling the second set of buffers to be accessed when a triggering condition occurs.

14. The method of claim 13, further comprising:

receiving an indication of the triggering condition.

15. The method of claim 13, further comprising:

processing the set of pre-processed frames in the first set of buffers to obtain the set of previously processed frames; and re-addressing the set of previously processed frames to the second set of buffers.

16. The method of claim 13, wherein the second set of buffers is configured to preserve the set of previously processed frames with a first sampling interval, the method further comprises:

allocating a third set of buffers in the plurality of buffers for preserving the set of previously processed frames with a second sampling interval, wherein the first sampling interval is temporally denser than the second sampling interval.

17. The method of claim 16, wherein the third set of buffers is associated with a third round-robin cycle with a third time-span, wherein the third time-span is longer than the second time-span.

18. The method of claim 16, wherein allocating the third set of buffers in the plurality of buffers for preserving the set of previously processed frames with the second sampling interval comprises:

sparsely selecting a subset of previously processed frames from the set of previously processed frames; and changing buffer allocation of the subset of previously processed frames to the third set of buffers.

19. The method of claim 13, further comprising:

storing the set of pre-processed frames to the first set of buffers;

down-sampling the set of pre-processed frames to obtain a set of down-sampled pre-processed frames; and storing, in parallel to storing the set of pre-processed frames to the first set of buffers, the set of down-sampled pre-processed frames to a third set of buffers.

20. A computer-readable medium storing computer executable code at a device, the code when executed by at least one processor causes the at least one processor to:

allocate a first set of buffers in a plurality of buffers for a set of pre-processed frames, wherein the first set of buffers is associated with a first round-robin cycle with a first time-span;

allocate a second set of buffers in the plurality of buffers for preserving a set of previously processed frames, wherein the second set of buffers is associated with a second round-robin cycle with a second time-span, wherein the second time-span is longer than the first time-span; and enable the second set of buffers to be accessed when a triggering condition occurs.

* * * * *